United States Patent
Lee

(10) Patent No.: US 7,921,842 B2
(45) Date of Patent: Apr. 12, 2011

(54) WATER-COOLED BARBECUE SYSTEM

(75) Inventor: Keun-jin Lee, Gyeonggi-do (KR)

(73) Assignee: Wellbas Limited, Gyeonggi-do (KR)

( * ) Notice: Subject to any disclaimer, the term of this patent is extended or adjusted under 35 U.S.C. 154(b) by 64 days.

(21) Appl. No.: 11/883,982

(22) PCT Filed: Feb. 17, 2006

(86) PCT No.: PCT/KR2006/000550
§ 371 (c)(1),
(2), (4) Date: Dec. 18, 2007

(87) PCT Pub. No.: WO2006/112598
PCT Pub. Date: Oct. 26, 2006

(65) Prior Publication Data
US 2009/0050131 A1 Feb. 26, 2009

(30) Foreign Application Priority Data
Feb. 18, 2005 (KR) .................. 10-2005-0013804
Jan. 19, 2006 (KR) .................. 10-2006-0005825

(51) Int. Cl.
*A47J 37/00* (2006.01)
*F24B 3/00* (2006.01)
(52) U.S. Cl. .................. 126/25 R; 126/37 B
(58) Field of Classification Search ........... 126/25 R
See application file for complete search history.

(56) References Cited

U.S. PATENT DOCUMENTS

| | | | |
|---|---|---|---|
| 1,938,470 A * | 12/1933 | Teller et al. | 126/340 |
| 4,200,039 A * | 4/1980 | Anderl | 99/302 R |
| 4,632,089 A | 12/1986 | Wardell | |
| 4,644,790 A * | 2/1987 | Mizoguchi | 73/293 |
| 4,744,292 A | 5/1988 | Nagata | |
| 4,798,132 A * | 1/1989 | Chan | 99/331 |

(Continued)

FOREIGN PATENT DOCUMENTS
CN 1292664 4/2001
(Continued)

OTHER PUBLICATIONS
International Search Report for PCT International Application No. PCT/KR2006/000550, mailed May 25, 2006.
(Continued)

*Primary Examiner* — Henry C. Yuen
*Assistant Examiner* — Frances Kamps
(74) *Attorney, Agent, or Firm* — RatnerPrestia

(57) ABSTRACT

Disclosed is a water-cooled barbecue system with a cooling fluid circulation system which avoids meat from sticking to a grill and from burning. The water-cooled barbecue system comprises: a body, the upper portion thereof being open to provide heat from the supplied fuel, a receiving space being defined by the body; a grill with a frame, the frame having a first communicating hole and a second communicating hole to introduce and/or discharge fluid, a fluid circulation tube communicating between the first communicating hole and the second communicating hole being provided inside of the frame; and a cooling device connected with the fluid circulation tube through the first communicating hole and the second communicating hole, and cooling fluid which circulates inside of the fluid circulation tube. The water-cooled barbecue system, which has the body at the upper portion thereof and the cooling device inside thereof, can further a housing, which can be moved and assembled.

19 Claims, 18 Drawing Sheets

U.S. PATENT DOCUMENTS

| | | | | |
|---|---|---|---|---|
| 4,819,614 | A * | 4/1989 | Hitch | 126/36 |
| 5,189,945 | A * | 3/1993 | Hennick | 99/339 |
| 5,236,005 | A * | 8/1993 | Berg | 137/360 |
| 5,341,793 | A * | 8/1994 | Brown | 126/41 R |
| 5,388,607 | A * | 2/1995 | Ramaker et al. | 137/88 |
| 5,993,744 | A * | 11/1999 | Rao et al. | 422/103 |
| 6,035,768 | A | 3/2000 | Kaufman | |
| 6,039,039 | A * | 3/2000 | Pina, Jr. | 126/25 R |
| 6,095,031 | A * | 8/2000 | Warne | 99/282 |
| 6,135,014 | A * | 10/2000 | Chang | 99/339 |
| 6,158,426 | A * | 12/2000 | Wardell | 126/25 R |
| 6,168,578 | B1 * | 1/2001 | Diamond | 604/29 |
| 6,182,453 | B1 * | 2/2001 | Forsberg | 62/125 |
| 6,230,700 | B1 * | 5/2001 | Daniels et al. | 126/25 R |
| 6,405,639 | B1 * | 6/2002 | Lee et al. | 99/331 |
| 6,431,164 | B1 * | 8/2002 | Wardell | 126/5 |
| 6,505,900 | B2 * | 1/2003 | Frederick | 312/319.7 |
| 6,610,937 | B2 * | 8/2003 | Yamaguchi | 200/4 |
| 6,640,800 | B1 * | 11/2003 | Hodgson et al. | 126/41 R |
| 6,899,019 | B2 * | 5/2005 | Han et al. | 99/338 |
| 7,057,140 | B2 * | 6/2006 | Pittman | 219/481 |
| 7,263,987 | B2 * | 9/2007 | Sung et al. | 126/25 R |
| 2003/0015188 | A1 | 1/2003 | Harbin | |
| 2003/0037907 | A1 * | 2/2003 | Lee | 165/104.19 |
| 2004/0154609 | A1 | 8/2004 | Han et al. | |
| 2005/0066956 | A1 * | 3/2005 | Sung et al. | 126/25 R |
| 2006/0000468 | A1 * | 1/2006 | Zelek et al. | 126/685 |

FOREIGN PATENT DOCUMENTS

| | | |
|---|---|---|
| CN | 2576143 Y | 10/2003 |
| CN | 1518941 | 8/2004 |
| CN | 2643800 Y | 9/2004 |
| JP | 2000-135170 | 5/2000 |
| KR | 10-2000-0059792 | 10/2000 |
| KR | 2000-0059792 A | 10/2000 |
| WO | WO 99/45831 | 9/1999 |

OTHER PUBLICATIONS

Supplementary European Search Report for EP 06 71 6001 dated Dec. 15, 2009.
Office Action for Korean Patent Application No. 10-2006-0005825 dated May 29, 2006.
Office Action for Chinese Patent Application No. 200680005322.9.
Canadian Office Action dated Mar. 10, 2010 for Canadian Application No. 2,598,538.
Japanese Office Action dated May 25, 2010 for Japanese Application No. 2007-556074 (with English translation).

* cited by examiner

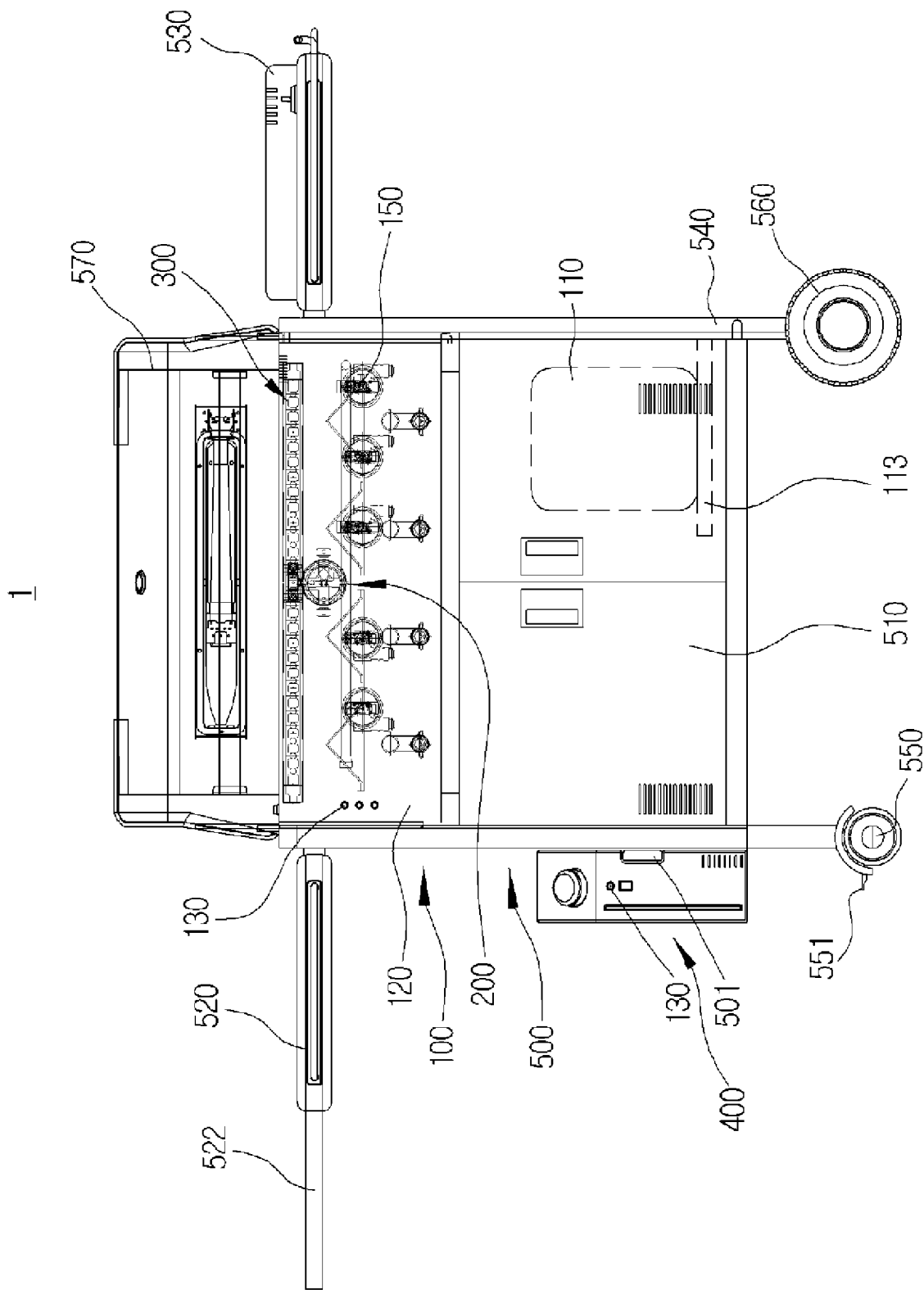
[Fig. 1]

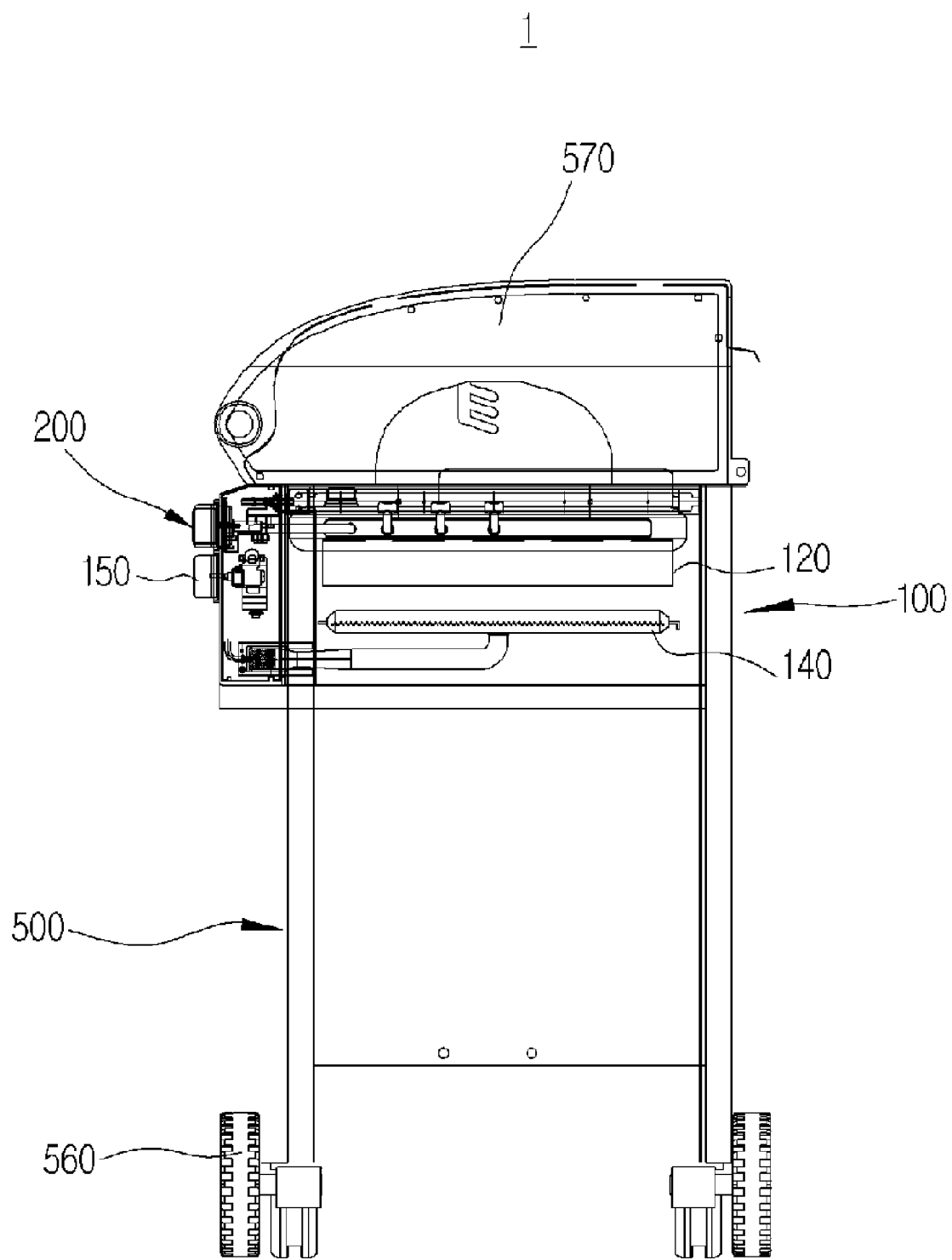
[Fig. 2]

[Fig. 3]
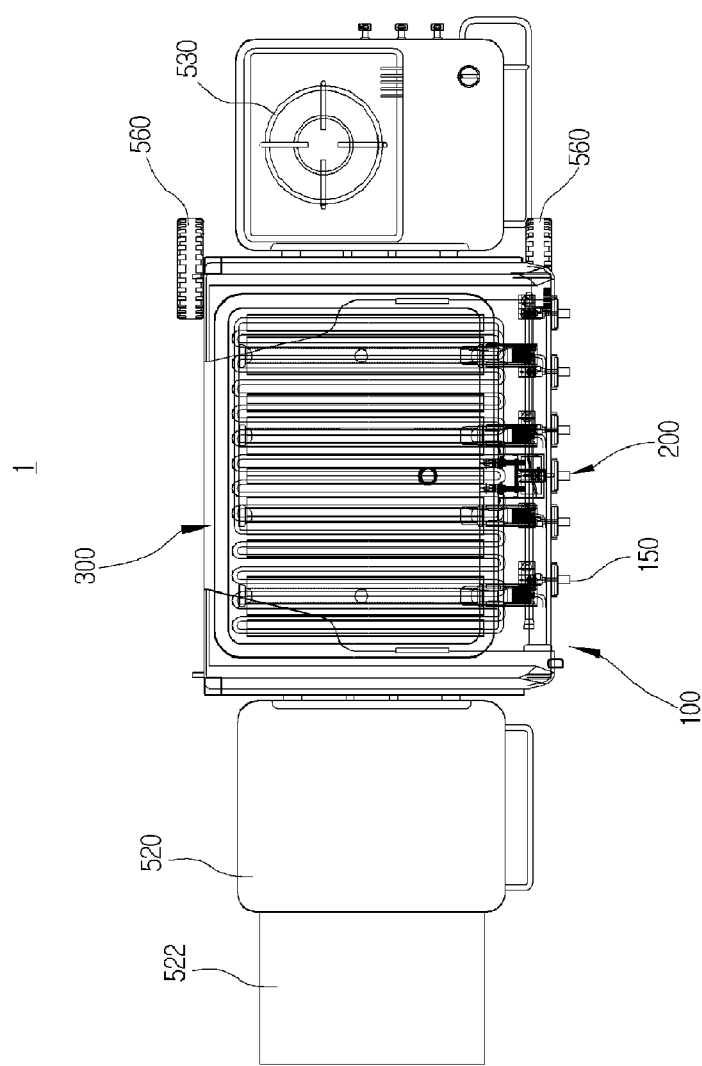
[Fig. 4]
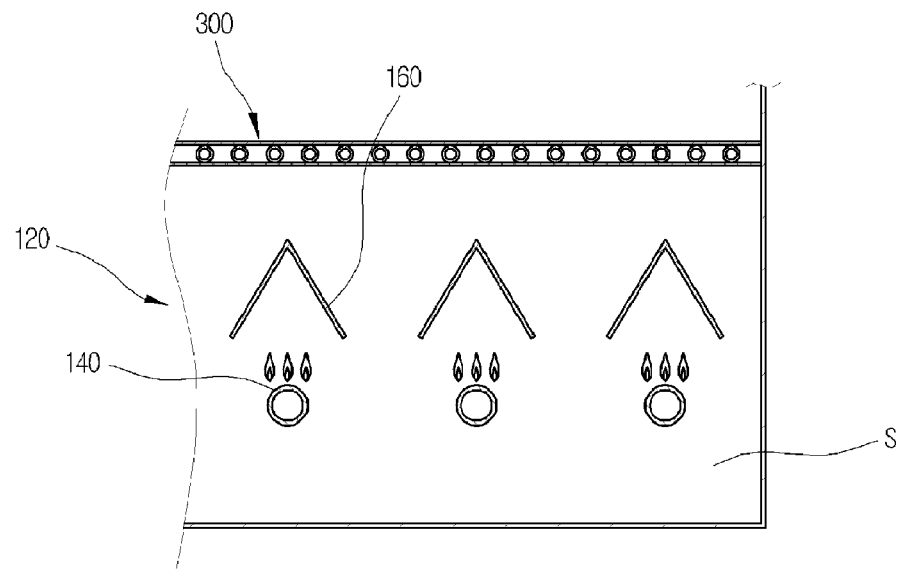

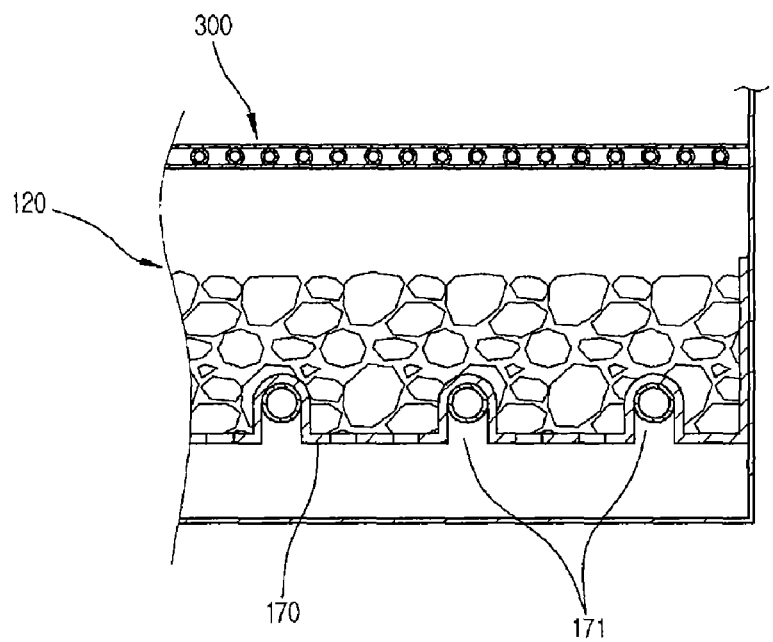
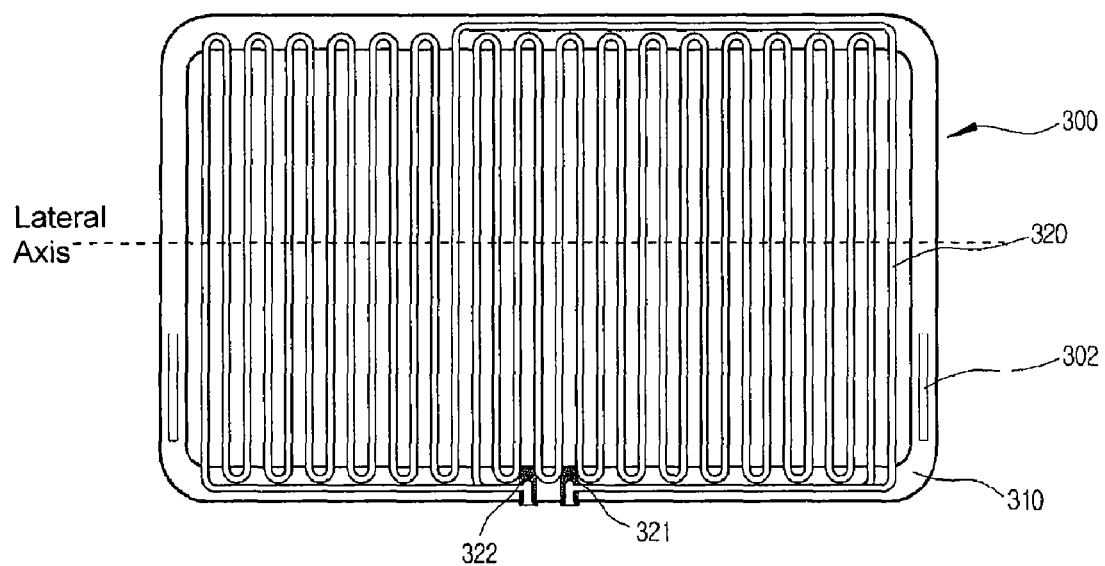

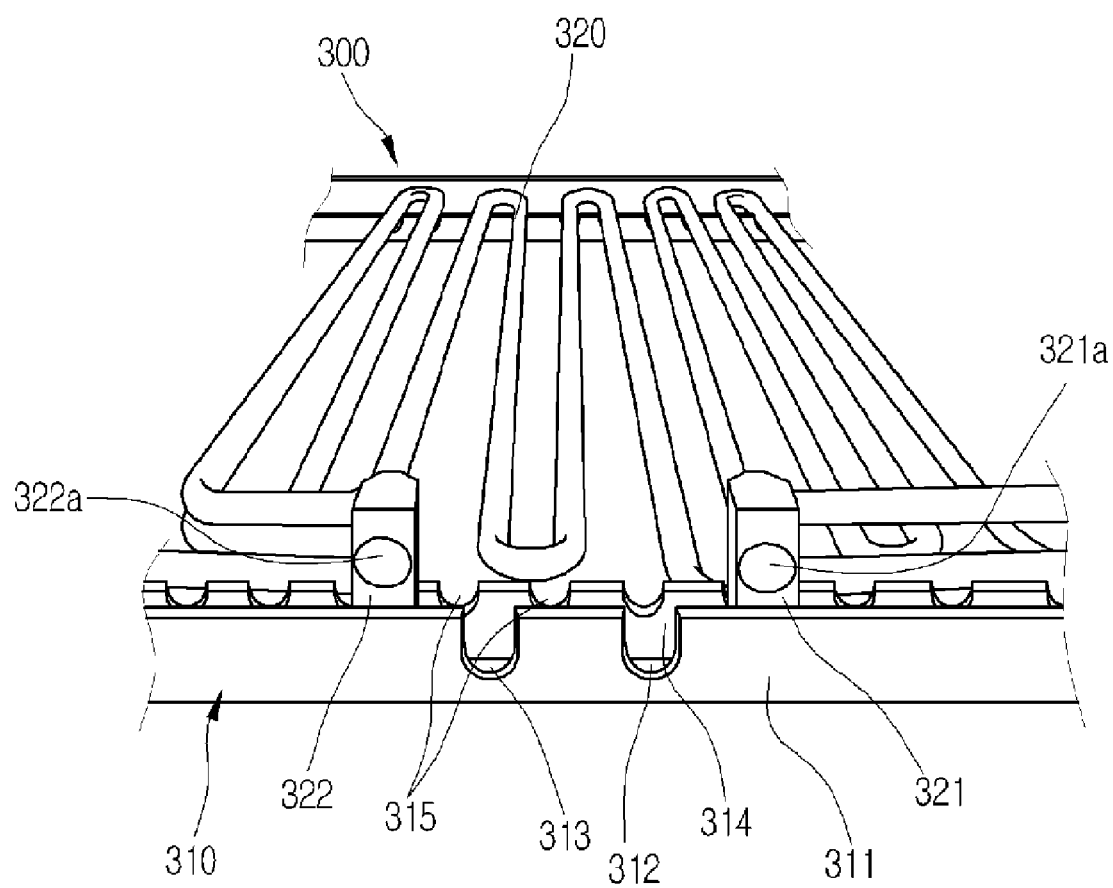
[Fig. 7]

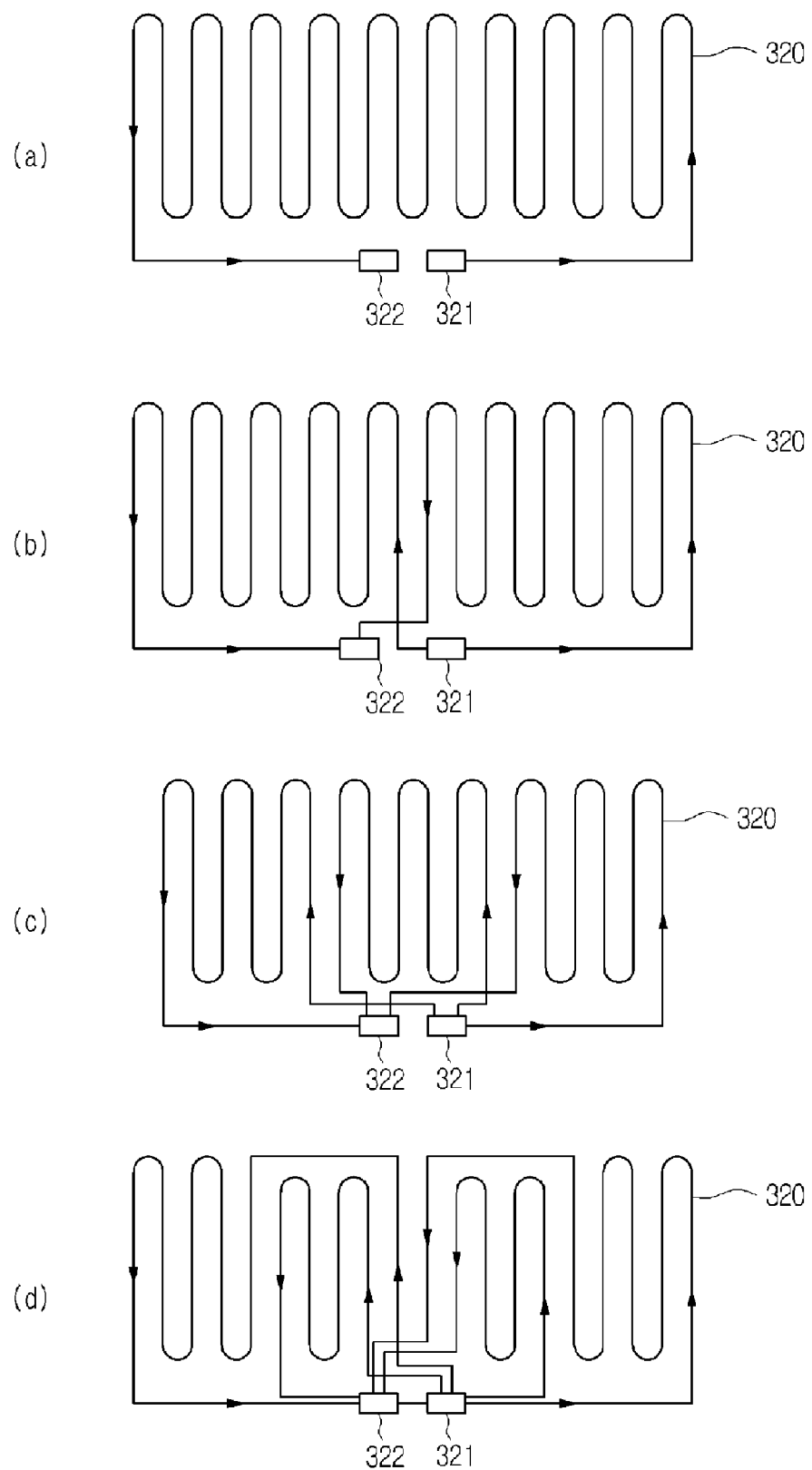
[Fig. 8]

[Fig. 9]
(a)
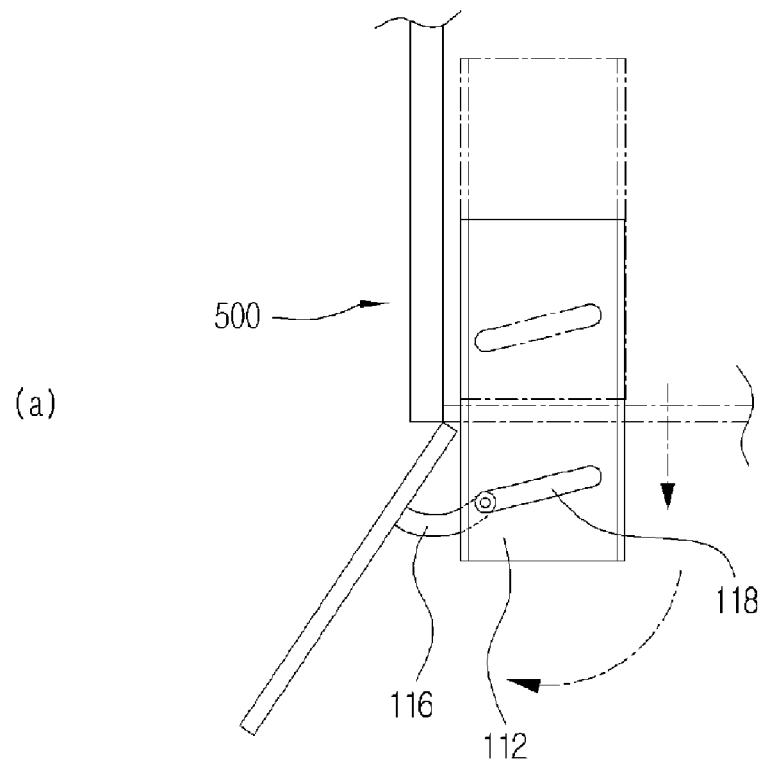
(b)
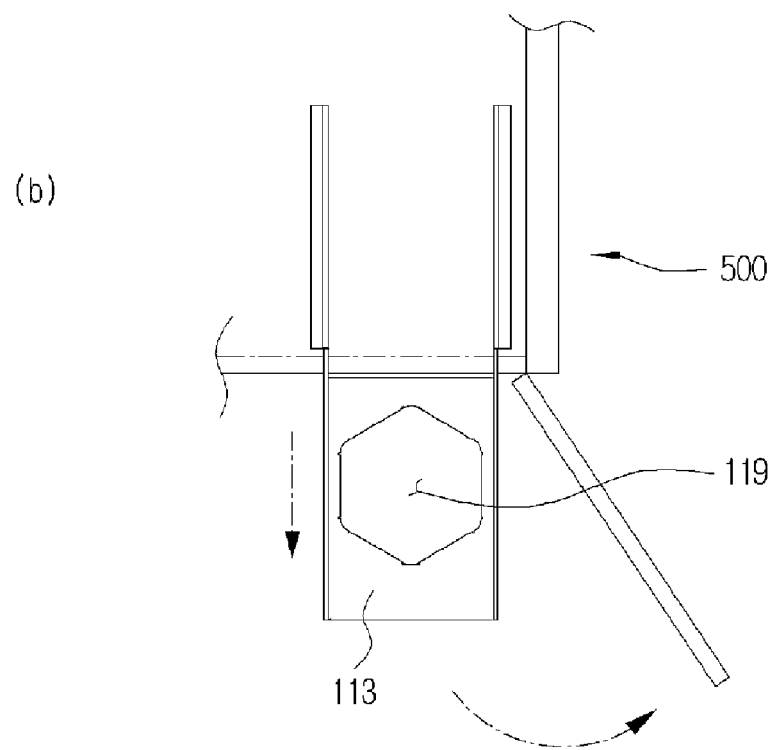

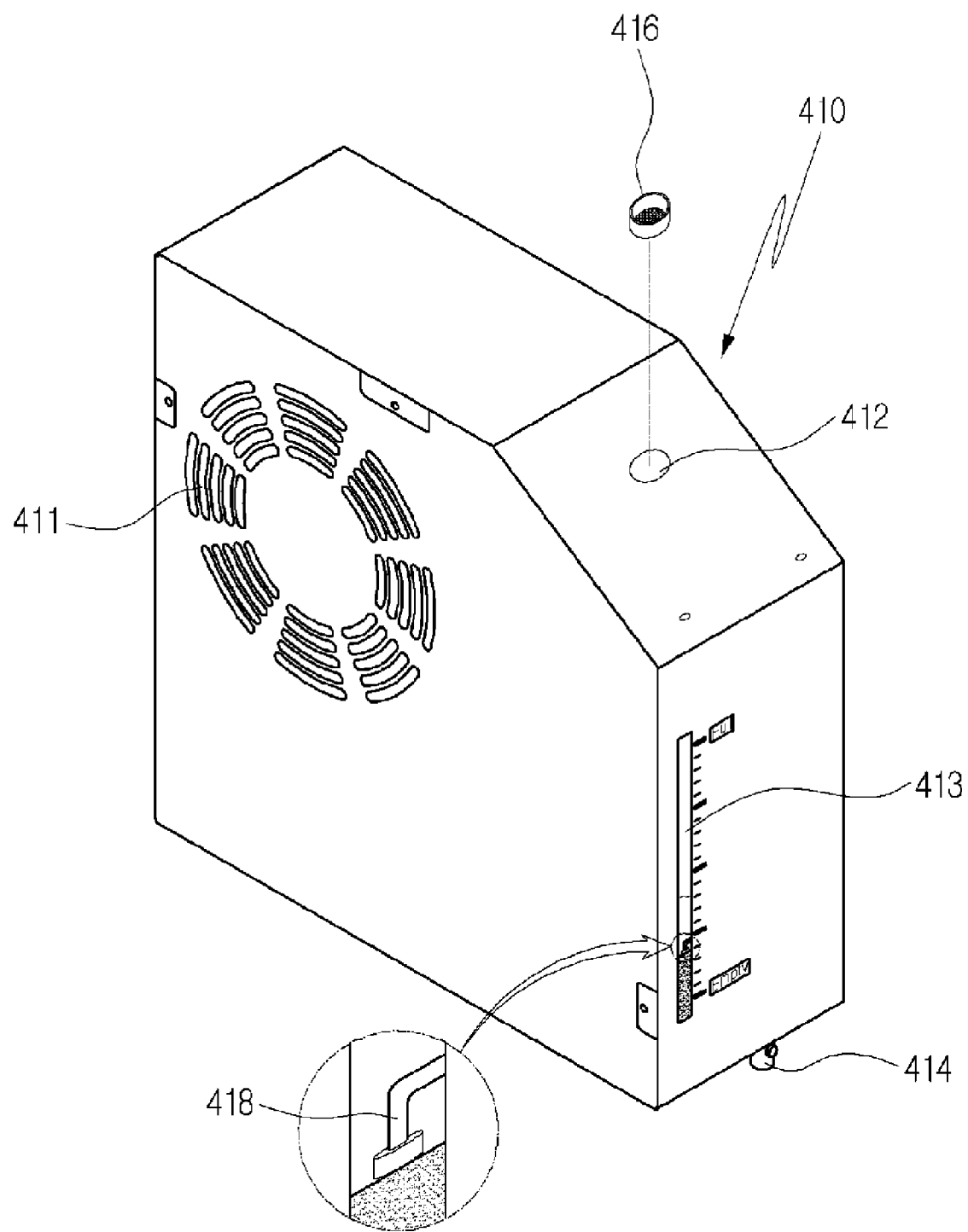
[Fig. 10]

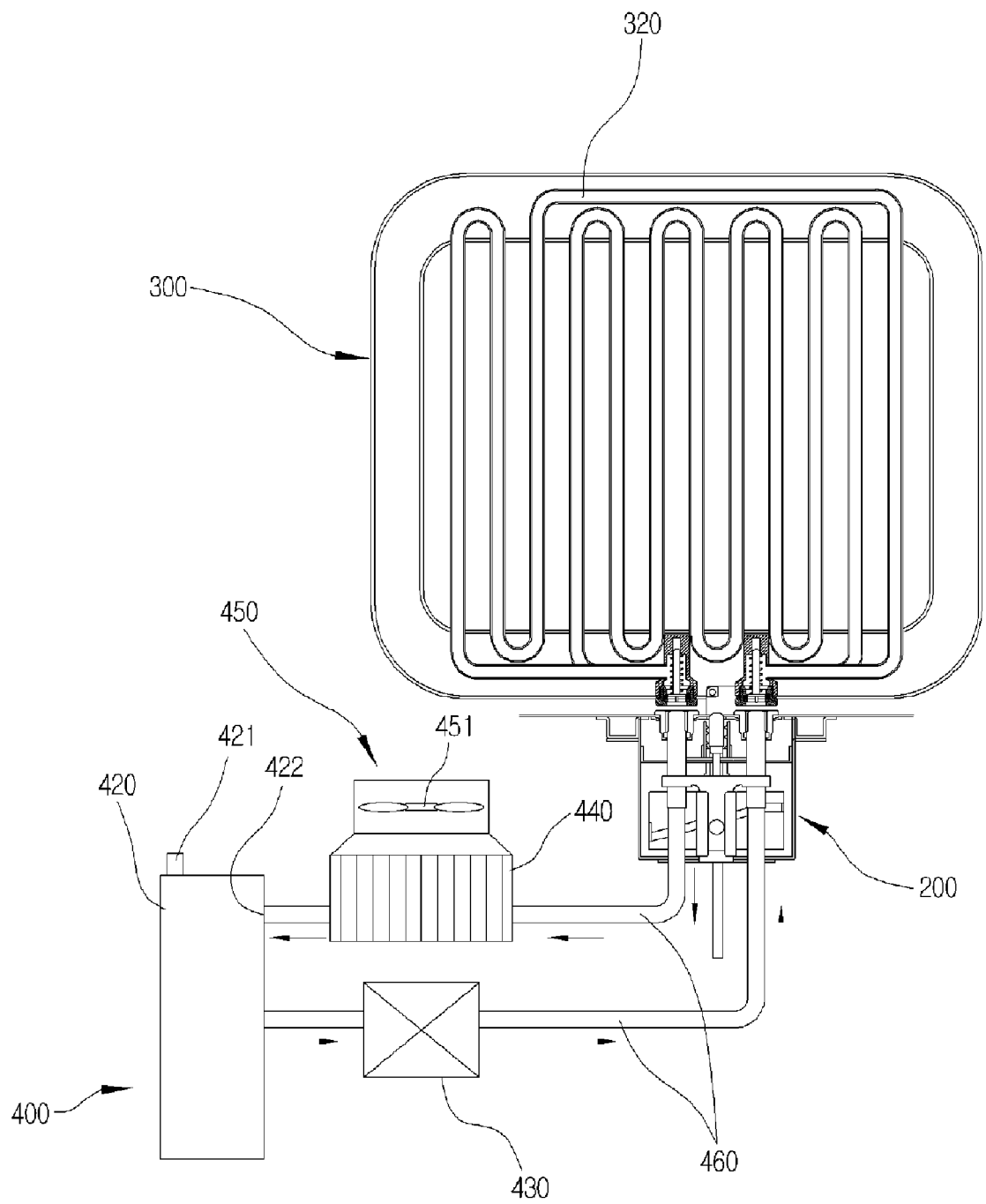
[Fig. 11]

[Fig. 12]
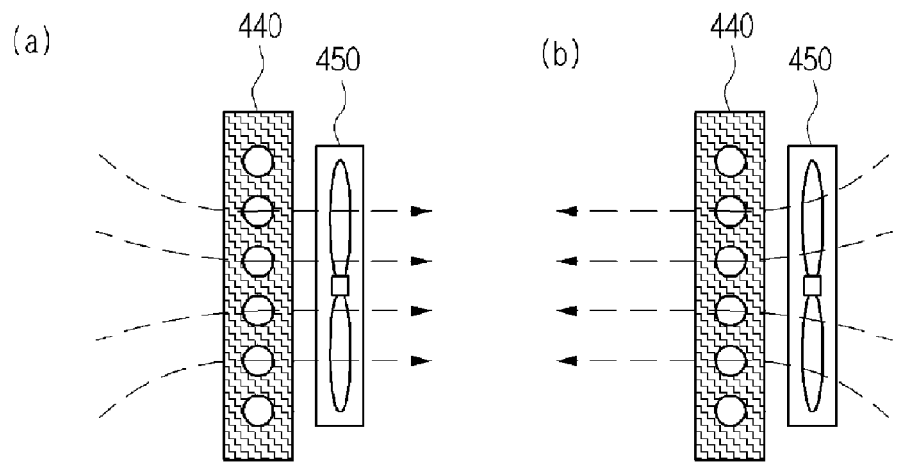
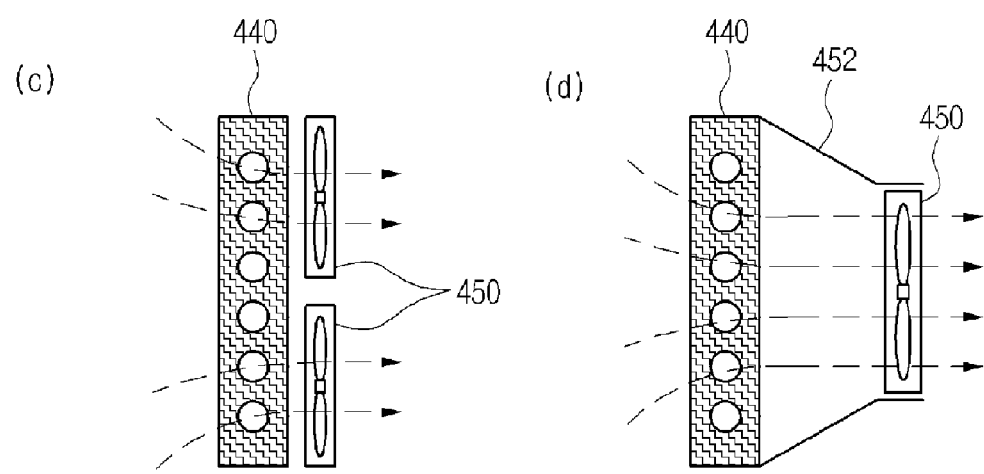
[Fig. 13]
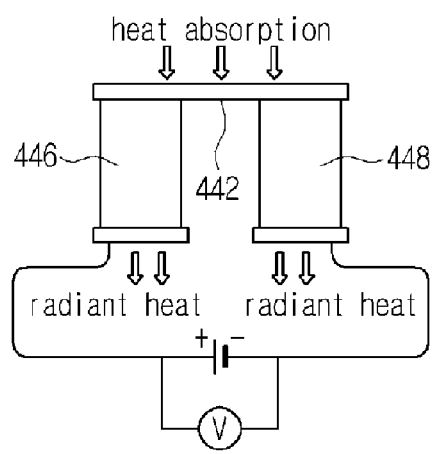

[Fig. 14]
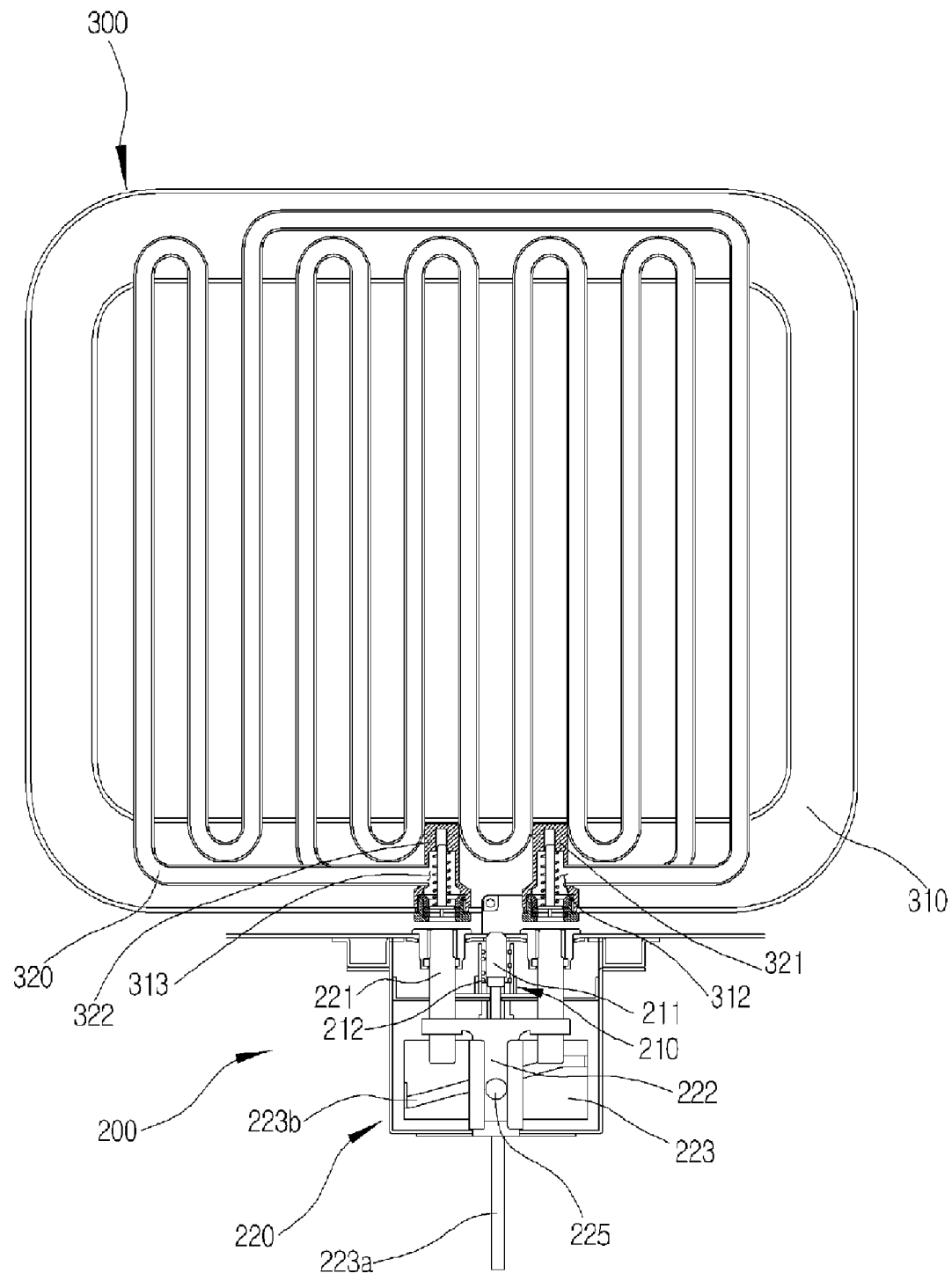

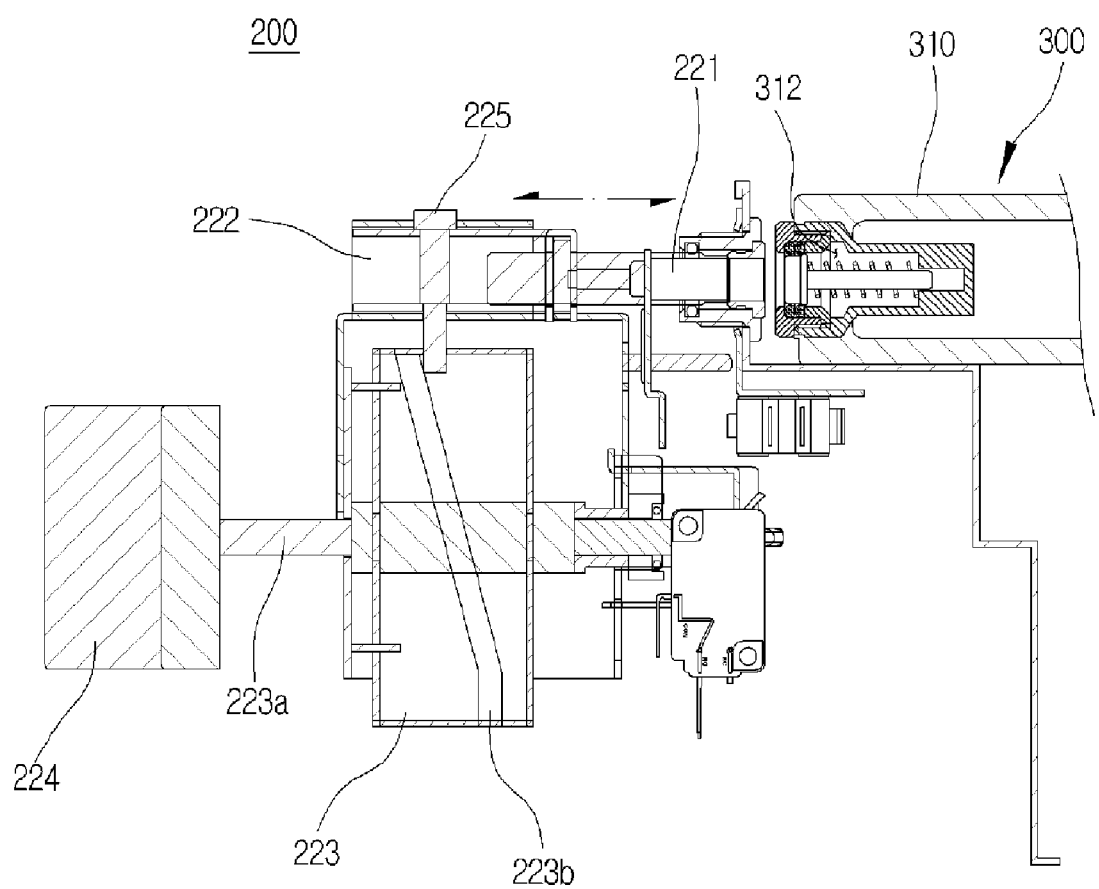
[Fig. 15]

[Fig. 16]
(a) 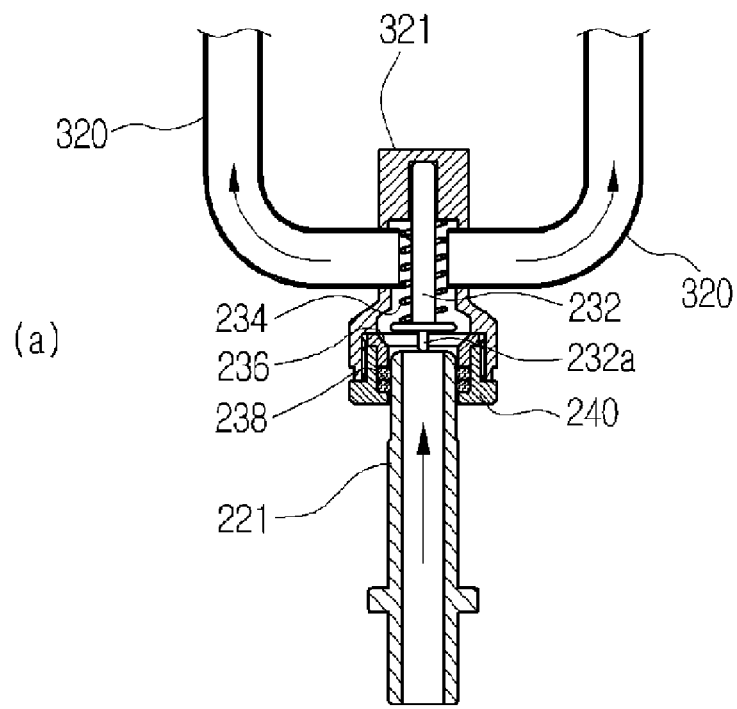
(b) 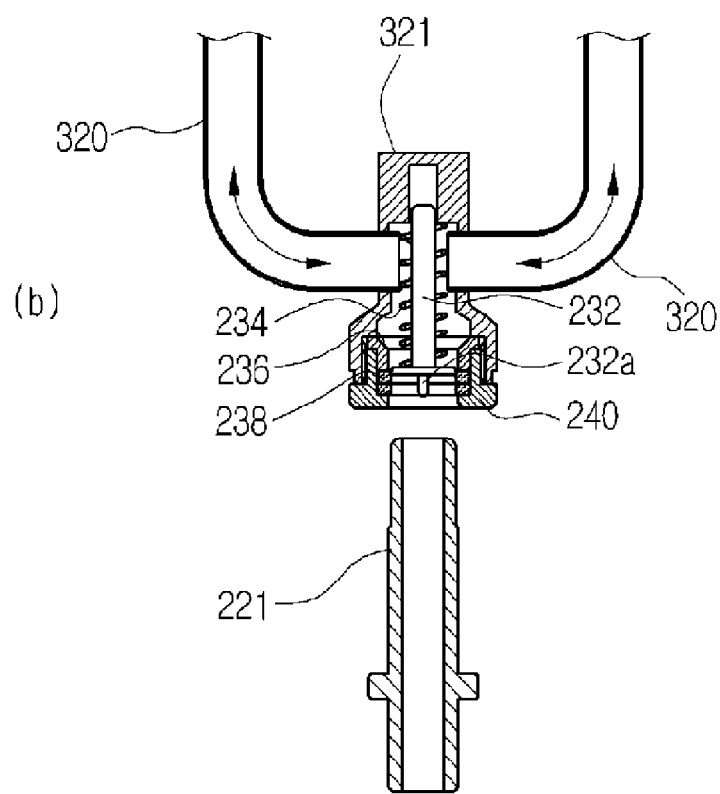

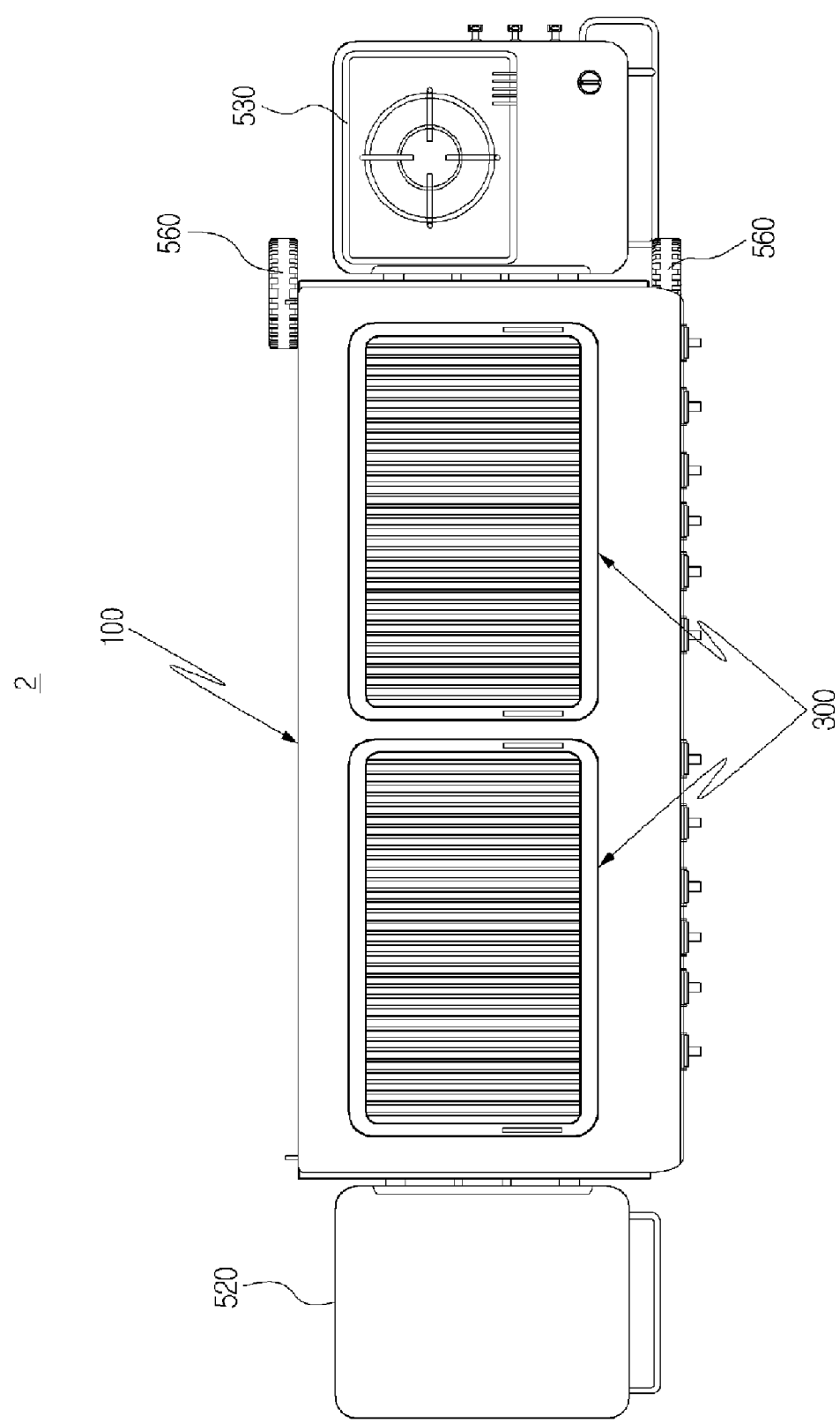
[Fig. 17]

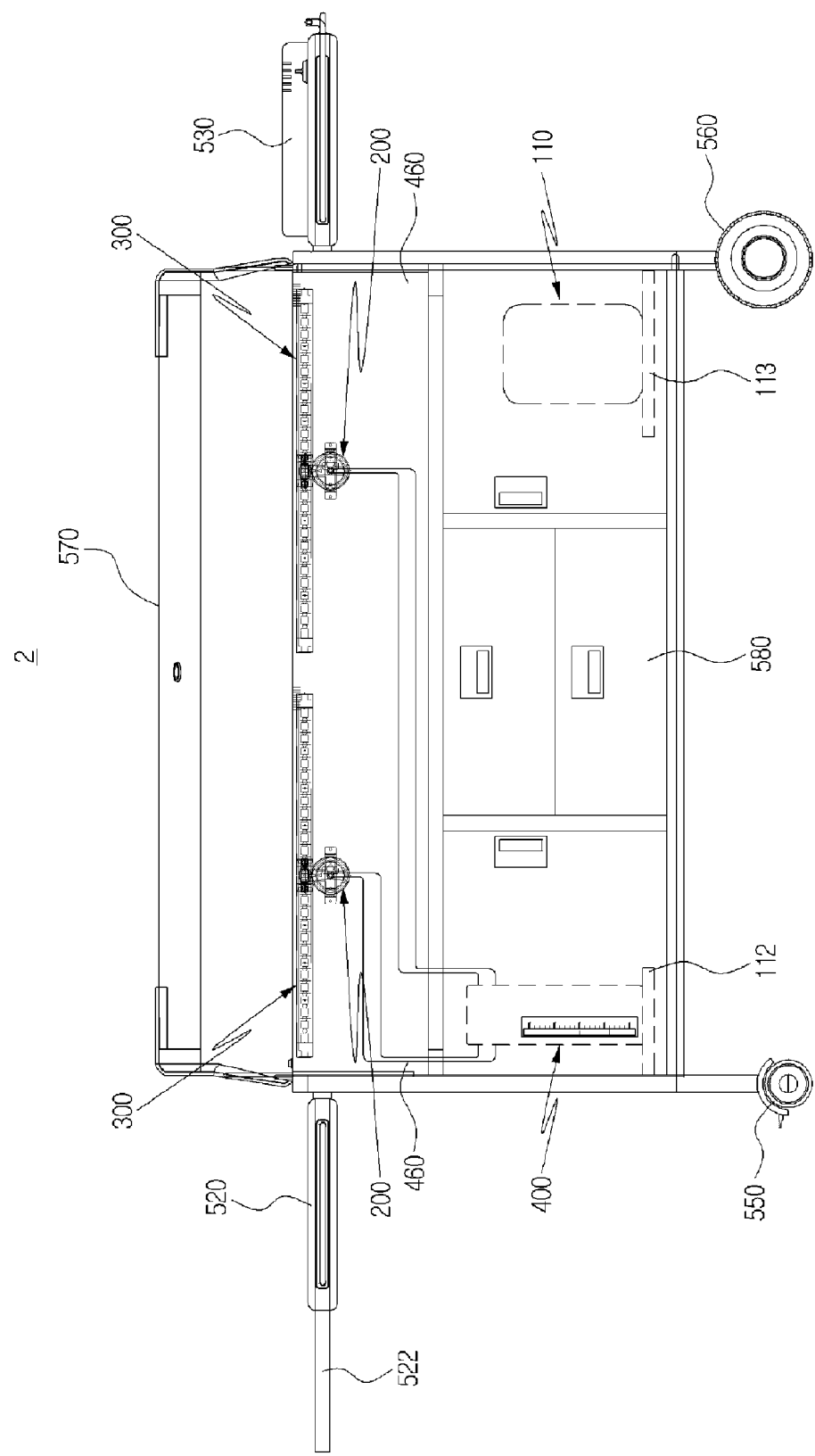
[Fig. 18]

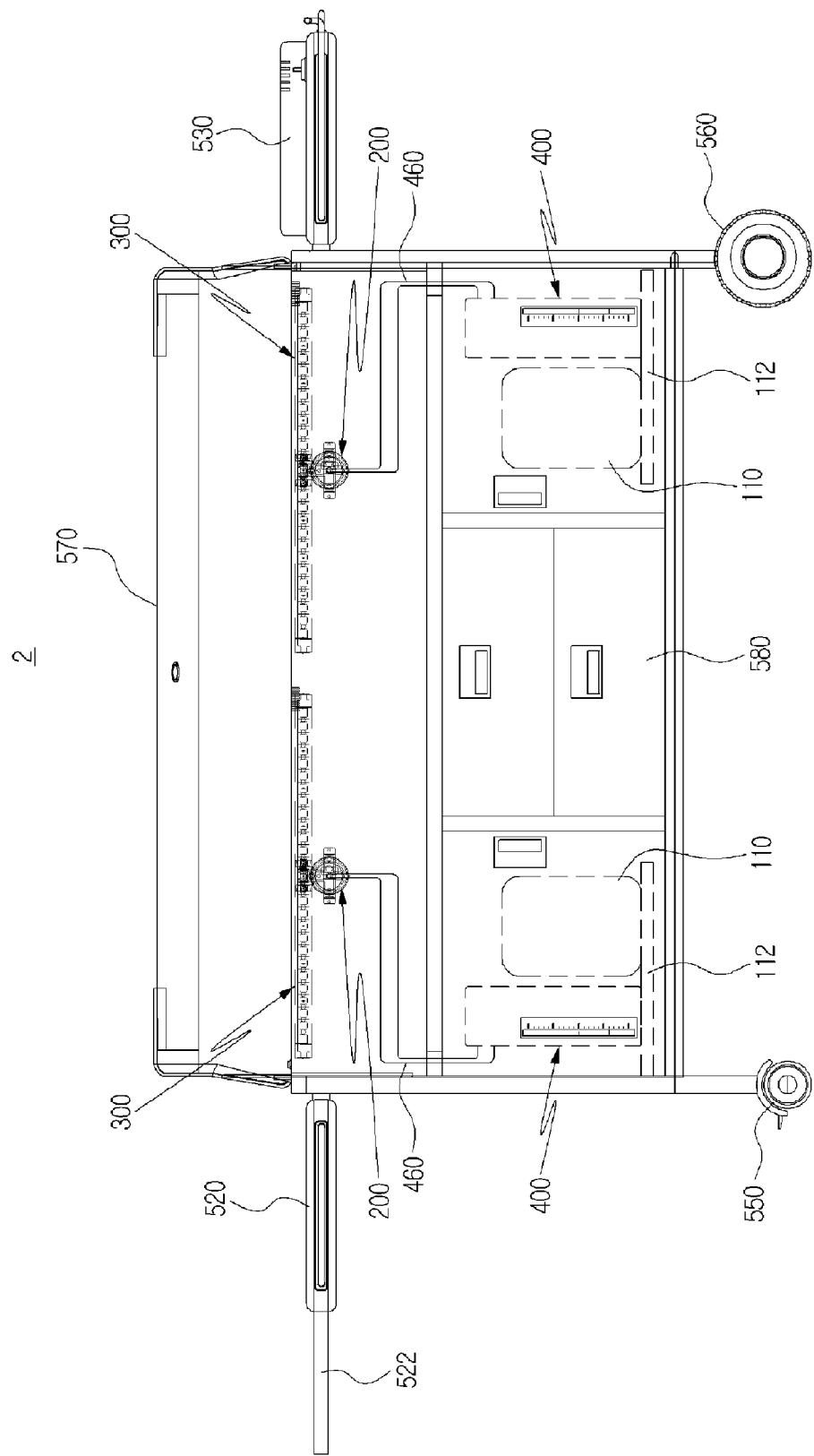
[Fig. 19]

[Fig. 20]
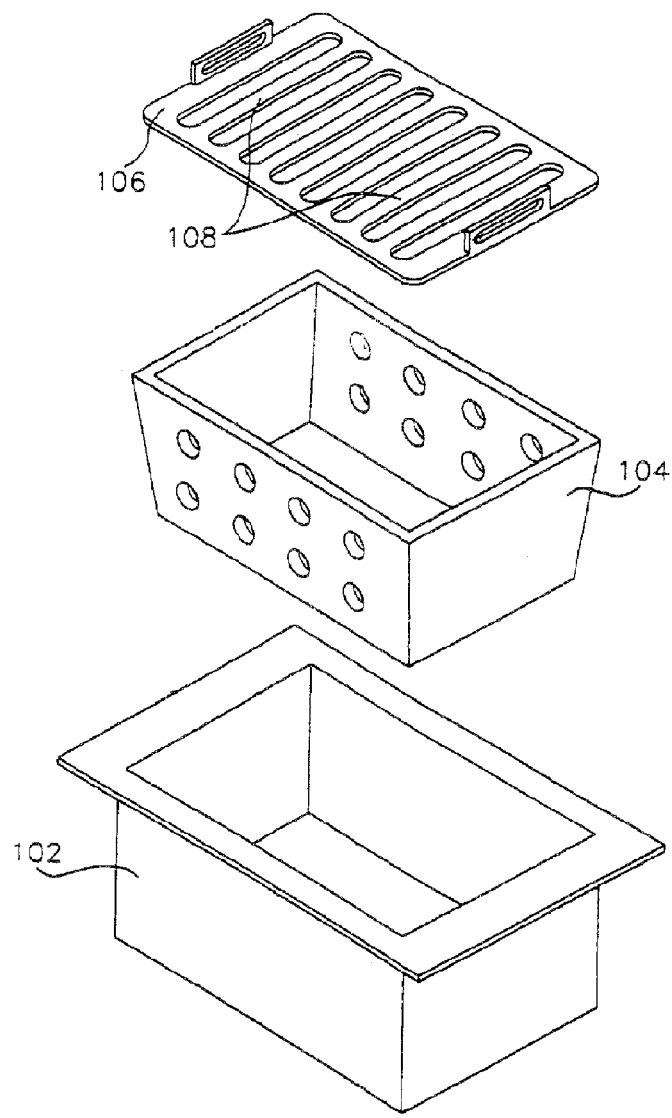
[Fig. 21]
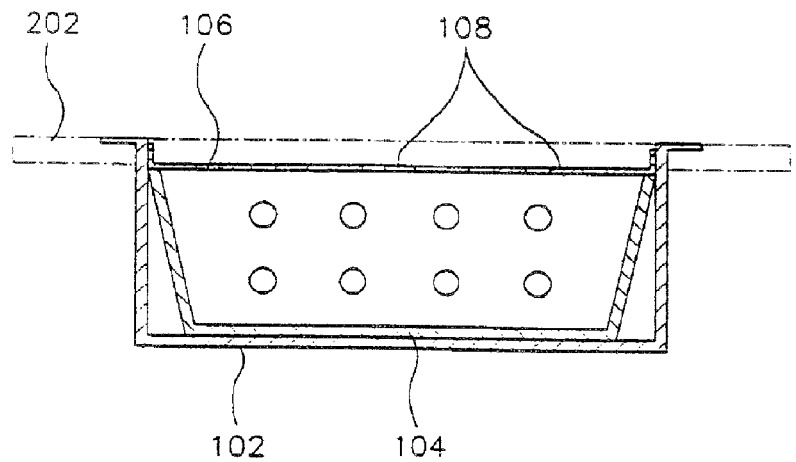

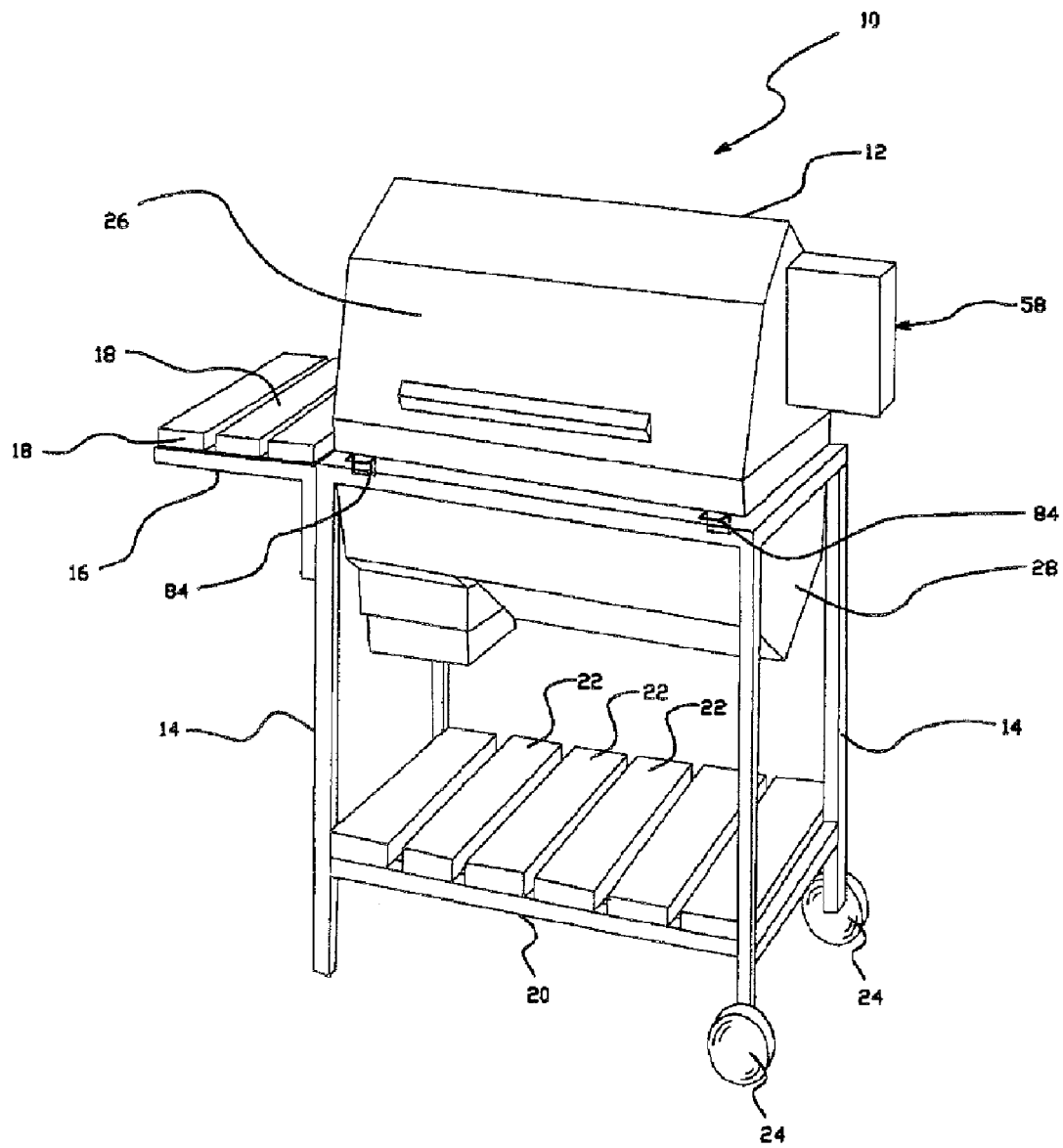
[Fig. 22]

WATER-COOLED BARBECUE SYSTEM

This is a U.S. National Phase Application of PCT International Application No. PCT/KR2006/000550, filed Feb. 17, 2006.

TECHNICAL FIELD

The present invention relates to a water-cooled barbecue system, particularly to a barbecue system having a cooling fluid circulation system at the lower portion of the grill on which meat to be roasted is placed, to avoid the meat from burning.

BACKGROUND ART

Generally, meat or fish is heated and cooked by means of a charcoal or a gas range so that the fat inside of the meat or fish can be controlled adequately for taste. When we roast meat or fish in such a manner, a grill is required to gradually roast them with a certain distance from the fire.

FIGS. 20 and 21 show a barbecue grill according to the conventional art.

Referring to FIGS. 20 and 21, a barbecue grill according to the conventional art has a body 102, a charcoal container 104, and a grill 106. The charcoal container 104 is located inside of the body 102. The grill 106 is placed at the upper portion of the body to hold the meat to be roasted. The grill 106 has a mesh portion 108 with equal spacing.

When the grill 106 is boarded over the upper portion of the charcoal container 104 and the meat to be roasted is placed on the grill 106, it is ready to cook the meat. During the cooking, the grill 106 is heated by the charcoal fire contained in the charcoal container 104. Thus, without regard to the progress of the cooking, the meat starts to stick to the mesh portion 108 of the grill 106. A portion of the meat contacted with the mesh portion 106 is burnt while the inside of the meat has not been cooked. Accordingly, while the meat is being cooked, the grill stuck to the meat should be replaced with a new one. However, since the replaced grill is also rapidly heated, the above process is repeated. Therefrom, the inconvenience of having to replace grills many times during the cooking is caused.

U.S. Pat. No. 4,744,292, which was granted to Toshio Nagata on Mar. 17, 1988, discloses a barbecue grill for roasting meat placed in a casing while avoiding the heat from transferring to a person.

Meanwhile, U.S. Pat. No. 6,230,700, which was granted to Dale T. Daniels et al on May 15, 2001, discloses a charcoal grill having a body separable from a frame.

FIG. 22 shows the Daniels' charcoal grill.

Referring to FIG. 22, a charcoal grill 10 includes a body 12. The body 12 is supported by a frame 14. At one side of the frame 14, an extended shelf 16 is integrally fixed. A plurality of support arms 84 are attached to the outer surface of the lower portion 26 of the body. The support arms 84 are placed on the frame 14 to support the body 12 of the charcoal grill 10. Due to this, the body 12 is easily separated from the frame 14 without using a tool. At the lower portion of the frame 14, a shelf 20 is placed to provide stability to the frame 14. At the lower end portion of the frame 14, a couple of wheels 24 are provided to help the charcoal grill 10 easily move. Opposite to the extended shelf 16, an air introduction system 58 is disposed at one side of the body 12. The air introduction system 58 includes an internal fan for introducing air flow.

However, such constructed charcoal grill 10 can be used only when the frame 14 and the body 12 are assembled. That is, the charcoal grill 10 can be separated from the frame 14 for cleaning purposes only, but it cannot be used indoors after separation. In addition, it still has the defect of burning the meat to be roasted.

DISCLOSURE OF INVENTION

Technical Problem

The present invention is provided to overcome the problem stated above which the prior art contains. One aspect of the present invention provides a barbecue system which avoids meat from sticking to a grill and from burning and can be used both indoors and outdoors.

Technical Solution

One embodiment of the present invention provides a water-cooled barbecue system comprising: a body, the upper portion thereof being open to provide heat from the supplied fuel, a receiving space being defined by the body; a grill with a frame, the frame having a first communicating hole and a second communicating hole to introduce and/or discharge fluid, a fluid circulation tube communicating between the first communicating hole and the second communicating hole being provided inside of the frame; and a cooling device connected with the fluid circulation tube through the first communicating hole and the second communicating hole, and cooling fluid which circulates inside of the fluid circulation tube.

The water-cooled barbecue system according to the present invention further comprises a housing, which can be moved and assembled, for receiving the body in a detachable manner at an upper portion thereof and receiving a cooling device inside of it.

At both sides of the upper portion of the grill, handles are coupled to be deflected from the lateral axis.

At the upper portion of the housing and at one side of the body, a shelf is provided. Inside of the shelf, an auxiliary shelf is installed in a sliding manner. Inside of the housing, sliding shelves are provided to receive the cooling device and a fuel tank, respectively, and guide rails are provided to withdraw the sliding shelves.

The body comprises a heating portion for supplying heat to the lower portion of the grill, a cooling switch portion for operating the cooling device to cool the heated grill, and a lamp for displaying the state of the operation of the cooling device by a signal from the cooling switch portion.

The heating portion includes a plurality of pipe-type burners arranged parallel inside of it, and may further includes a charcoal container disposed at the upper portion of the plural pipe-type burners.

The cooling switch portion includes a grill sensor portion for sensing the existence of the grill and determining whether to supply fluid, and an operation switch portion for supplying fluid to the fluid circulation tube by the handling of a user.

The fluid circulation tube includes a first socket and a second socket which communicate with the first communicating hole and the second communicating hole, respectively. One or more tubes are branched from the first socket to form a wave path and returned to the second socket. The first and second sockets are made in a manner avoiding the leakage of fluid.

The cooling device is provided in a separate cooling kit. The cooling device includes a tank for containing fluid inside of it, a pump for pumping the fluid inside of the tank toward the fluid circulation tube, a cooler for cooling the fluid which has been discharged after circulation in the fluid circulation tube, a cooling fan for circulating cool air to cool down the heated cooler, and a connection hose for connecting the tank and the fluid circulation tube.

The cooling kit includes a transparent window and a buoy for marking the water level in the tank, a drain disposed at a bottom surface thereof for discharging water, and an inflow hole disposed at an upper portion thereof for introducing fluid, the inflow hole having a filter for filtering impurities.

The cooling kit is placed on the sliding shelf disposed in the housing. Between the sliding shelf and a door of the housing, a crank bar for withdrawing the sliding shelf is provided.

A duct is installed between the cooling fan and the cooler.

The cooler includes a cooling portion with a thermoelectric element and a power supply portion.

As for the operation of the water-cooled barbecue system according to the present invention, if the grill is mounted on the upper portion of the body, the grill sensor portion senses the grill and operates the cooling device. According to this, fluid circulates in the fluid circulation tube of the grill.

Advantageous Effects

As described so far, the water-cooled barbecue system according to the present invention avoids the overheating of a grill by having the cooling fluid circulation system at the lower portion of the grill, and thus, the meat to be cooked is prevented from sticking to the grill and burning.

Also, the water-cooled barbecue system according to the present invention can be used both indoors and outdoors by being attached to or detached from the moveable housing. Also, since various fuels, such as charcoal and gas, can be used, the efficiency of the grill becomes high.

Also, according to the present invention, since a sensor for sensing the grill is provided, the cooling device is not operated while the grill is removed. Thus, high stability is expected.

Thus, since the water-cooled barbecue system according to the present invention can roast meat without burning it, the fat inside of the meat can be removed while as much of the meat juice as possible is kept. Thus, tender and soft tasty meat can be obtained.

Also, since the water-cooled barbecue system according to the present invention provides the fluid circulation tube with a structure for avoiding the leakage of fluid, the user can move or detach the grill reliably.

Also, according to the water-cooled barbecue system of the present invention, since meat does not stick to the grill, the grill can be cleaned after use with ease and the amount of synthetic detergent consumed can be reduced. Thus, it contributes to water quality conservation.

It is understood by those skilled in the art that various changes or modifications may be made in the above embodiment of the present invention without departing from the spirit and scope of the invention. Thus, the scope of the present invention will be represented by the claims to follow.

BRIEF DESCRIPTION OF THE DRAWINGS

FIG. 1 is a front elevation view showing the water-cooled barbecue system according to the preferred embodiment of the present invention;

FIG. 2 is a side elevation view showing the water-cooled barbecue system as shown in FIG. 1;

FIG. 3 is a plan view showing the water-cooled barbecue system according to the preferred embodiment of the present invention;

FIG. 4 is a partial plan view showing the heating portion of the water-cooled barbecue system as shown in FIG. 1, wherein gas is used as the fuel;

FIG. 5 is a partial plan view showing the heating portion of the water-cooled barbecue system as shown in FIG. 1, wherein charcoal is used as the fuel;

FIG. 6 is a plan view showing the grill of the water-cooled barbecue system as shown in FIG. 3;

FIG. 7 is a perspective view showing the part of the grill as shown in FIG. 6;

FIG. 8, (a)-(d) are views showing various examples of the fluid circulation tube of the grill;

FIG. 9, (a) and (b) are partial plan views showing the inside of the cabinet according to the present invention;

FIG. 10 is a perspective view showing the cooling kit according to the present invention;

FIG. 11 is a view showing the operation of the cooling device according to the present invention;

FIG. 12, (a)-(d) are views showing various examples of the structure of the cooling fan according to the present invention;

FIG. 13 is a view showing the thermoelectric element applied to the cooler according to the present invention;

FIG. 14 is a view showing the process for assembling the cooling switch portion with the fluid circulation tube according to the present invention;

FIG. 15 is a side sectional view showing the cooling switch portion as shown in FIG. 14;

FIG. 16, (a) and (b) are views showing the structure for avoiding the leakage of fuel in the fluid circulation tube;

FIG. 17 is a view showing the water-cooled barbecue system wherein two grills are used;

FIGS. 18 and 19 are views showing the method for cooling the two grills as shown in FIG. 16, and in particular, FIG. 18 is a front elevation view of the water-cooled barbecue system with one cooling device and FIG. 19 is a front elevation view of the water-cooled barbecue system with two cooling devices;

FIG. 20 is a perspective view showing the parts of the barbecue grill according to the prior art;

FIG. 21 is a sectional view showing the combined state of the barbecue grill as shown in FIG. 20; and FIG. 22 is a perspective view showing another charcoal grill according to the prior art.

MODE FOR THE INVENTION

Hereunder, with reference to the attached drawings, a preferred embodiment of the present invention is explained in detail.

FIGS. 1-3 illustrate a water-cooled barbecue system 1 according to the preferred embodiment of the present invention.

By referring to FIGS. 1-3, a body 100 of the water-cooled barbecue system 1 according to the preferred embodiment of the present invention can be coupled to a housing 500 which can be moved and assembled. The upper portion of the body 100 is open and the body 100 has a space therein. A grill 300 is provided inside of the body 100 and a heating portion 120 is provided at the lower portion of the grill 300.

The heating portion 120 generates heat for heating the grill 300. At a front sidewall of the heating portion 120, a plurality of control knobs 150 are provided. The control knobs 150 can be disposed at an upper portion of the body 100.

FIGS. 4 and 5 illustrate the states of the heating portion 120 which can be used differently according to fuel.

If gas is used, a plurality of pipe-type burners 140 are arranged to be parallel with a receiving space S. The shape of the burner is not confined to this type. At the upper portion of the pipe-type burners, a plurality of radiation plates 160 are disposed detachably. Gas is contained in a separate fuel tank 110.

If charcoal is used as the fuel, the heating portion 120 can be a charcoal container 170 for receiving charcoal. The charcoal container 170 is box-shaped and the upper portion thereof is open so that charcoal, firewood, briquettes, etc. can be variously contained. The charcoal container 170 is placed at the upper portion of the burner 140 after the radiation plates 160 are removed. On the bottom surface of the charcoal container 170, a recess can be provided for the pipe-type burner 140 to go into. The charcoal can be exhausted continuously by air supplied from the pipe-type burner 140.

Meanwhile, if the fuel is gas, the control knobs 150 can control the amount of heat supplied from the plural pipe-type burners 140 respectively. If the fuel is charcoal, the control knobs 150 control the amount of air supplied into the receiving place of the body 100.

By referring to FIGS. 1-3 again, a cooling switch portion 200 is provided at the front center of the body 100. The cooling switch portion 200 operates a cooling device 400 to supply cooling fluid to a grill 300. The cooling switch portion 200 and the cooling device 400 will be explained in detail later.

A lamp 130, which is provided at a front sidewall of the heating portion 120, displays the operating state of the cooling device 400 by the signal from the cooling switch portion 200. Preferably, the lamp 130 is made of LED. The lamp can be provided at the cooling device 400, which will be illustrated later.

A handle 302 (shown in FIG. 6) is attached at both sides of the upper portion of the grill 300. The handle 302 is placed at a front-sided portion from the lateral axis of the grill, so that the user can conveniently and stably take the grill 300 off the water-cooled barbecue system 1 using the handle 302. That is, if the user separate the grill 300 in which fluid is filled, the user can be injured due to hot water flowing out of the grill. In this event, if the user uses the handles 302, since the fluid opening is directed upward, there is no concern over water flowing out of the grill.

Meanwhile, the housing 500 includes a cabinet 510 disposed at the lower portion of the body 100, a shelf 520 provided at both sides of the body 100 and a cooker 530. Inside of the shelf 520, an auxiliary shelf 522 is slidingly provided. At the upper portion of the housing 500, a cap 570 is provided to cover the body 100. The cap 570 is hinge-assembled with the housing 500.

At the corners of the cabinet 510, a plurality of legs 540 extend downwardly. At the lower ends of the legs 540, a first wheel 550 and a second wheel 560 are provided to make the housing 500 move. At the first wheel 550, a stopper 551 is formed to make the housing stop.

Inside of the cabinet 510, a fuel tank 110 and sliding shelves 112, 113 for receiving a cooling kit 410, which will be explained later, are provided respectively. Between the sliding shelf 112, the cooling kit 410 being placed thereon, and the door of the cabinet 510, a crank bar 116 is provided. The crank bar 116 makes the sliding shelf 112 come outside while the door of the cabinet 510 is open.

FIGS. 6 and 7 illustrate the grill 300 of the water-cooled barbecue system 1. By referring to FIGS. 6 and 7, the grill 300 includes a frame 310 and a fluid circulation tube 320 with a wave path. The frame 310 has a certain square-shape and is divided into upper and lower parts. At an outer sidewall 311 of the frame 310, a first communicating hole 312 and a second communicating hole 313 are formed. At an inner sidewall 314 of the frame 310, a plurality of recesses 315 are formed so that the fluid circulation tube can go through it. If the upper and lower parts of the frame are coupled together, the first communicating hole 312 and the second communicating hole 313, which are originally in the shape of hemicycle, come to make a cycle-shaped hole.

The fluid circulation tube 320 is a portion supporting the meat to be roasted and forms a wave path which is arranged at an equal distance from one another in the frame 310. The fluid circulation tube 320 is repeatedly arranged to divide the width of the grill 300 into at least two. While the fluid circulation tube 320 is being heated, since fluid circulates inside of the fluid circulation tube 320, the meat is properly roasted without sticking or burning.

The fluid circulation tube 320 includes a first socket 321 and a second socket 322. The first socket 321 and the second socket 322 are provided between the outer sidewall 311 and the inner sidewall 314 of the frame 310. At both ends of the first socket 321 and the second socket 322, a first through hole 321a and a second through hole 322a are respectively formed to communicate with the first communicating hole 312 and the second communicating hole 313.

FIGS. 8(a)-(d) illustrate various types of fluid circulation tubes 320.

By referring to FIG. 8(a) showing a one-way type fluid circulation tube 320, it has a one-way fluid path communicating from the first socket 321 to the second socket 322.

By referring to FIG. 8(b) showing a two-way type fluid circulation tube 320, it has two fluid paths which are diverged from the first socket 321 and communicated to the second socket 322 in a zigzag manner.

By referring to FIG. 8(c) showing a three-way type fluid circulation tube 320, it has three fluid paths which are diverged from the first socket 321 and communicated to the second socket 322 in a zigzag manner.

By referring to FIG. 8(d) showing a four-way type fluid circulation tube 320, it has four fluid paths which are diverged from the first socket 321 and communicated to the second socket 322 in a zigzag manner.

Among these various types of fluid circulation tube 320, a fluid circulation tube 320 with multi-paths has high cooling efficiency. That is, if the fluid circulation tube 320 has multi-paths, since the path of the fluid is shortened, the temperature of fluid is not increased much. Thus, high cooling efficiency is obtained.

FIG. 9(a) illustrates the operation of a sliding shelf 112 on which a cooling kit 410 placed. The inside of the door of the cabinet 510 is connected to the sliding shelf 112 by means of a crank bar 116 so that when the door of the cabinet 510 is opened, the sliding shelf 112 is withdrawn by being linked therewith. One end of the crank bar 116 is fixed to the inside of the door of the cabinet 510, and the other end is installed to be movable along a groove 118 formed at the sliding shelf 112.

By referring to FIG. 9(b), at the sliding shelf 113 on which the fuel tank 110 is placed, an approximately hexagonal groove 119 is made. By the groove 119, the fuel tank 110 can be stably placed on the sliding shelf 113.

FIGS. 10 and 11 illustrate the cooling device 400.

By referring to FIG. 10, the cooling device 400 includes a cooling kit 410 which can be attached and detached outside of the body 100, therein. At a sidewall of the cooling kit 410, an air hole 411 for introducing and exhausting outside air is formed. At an upper portion of the cooling kit 410, an injection hole 412 for injecting fluid is formed. The injection hole 412 has a filter 416. In front of the cooling kit 410, a transparent window 413 and a buoy 418 for displaying the water level therein are provided. At the bottom surface of the cooling kit 410, there is a drain 414 for draining water with ease in case the water-cooled barbecue system 1 is kept for a long time without being used.

By referring to FIG. 11, the cooling device 400 includes a tank 420, a pump 430, a cooler 440, a cooling fan 450, and a connection hose. The tank 420 contains and keeps the fluid. The pump 430 pumps the fluid in the tank 420 to supply the fluid circulation tube 320. The cooler 440 cools the fluid which has been exhausted after the circulation. The cooling fan 450 circulates cool air to cool down the heat of the cooler 440. The connection hose 460 forms a supplying path from the tank 420 to the fluid circulation tube 320 via the pump 430, and a returning path from the fluid circulation tube 320 to the tank 420 via the cooler 440. That is, the connection hose 460 supplies fluid from the tank 420 to the fluid circulation tube 320 and returns the fluid, which has circulated the fluid circulation tube 320, to the tank 420.

According to the operation of the above constructed cooling device 400, when the water-cooled barbecue system 1 is in use, fluid flows in the following process.

If the pump 430 sends cool fluid in the tank 420 to the fluid circulation tube 320 through the connection hose 460, the cool fluid enters into the fluid circulation tube 320 via the first socket 321 and circulates along the path of the fluid circulation tube 320. Heated fluid which has circulated the fluid circulation tube 320 is discharged from the second socket 322 of the fluid circulation tube 320. This heated fluid is cooled by passing through the cooler 440 through the connection hose 460. Thus, the fluid becomes cool when entering the tank 420.

The tank 420 is made of transparent plastic. The tank 420 has a fluid supplement hole 421 at an upper portion thereof and a fluid exhaust hole 422 at one side thereof. The fluid contained in the tank 420 is water, coolant, etc.

The cooler 440, as publicly known, includes a compressor, a condenser, an evaporator, and an expansion valve. The cooler 440 can be composed of a cooling part including a thermoelectric element and a power source supplying part.

The cooling fan 450 is driven by a fan motor 451 and sends cool air to the cooler 440.

The connection hose 460 is arranged to go through the inner space of the cabinet 510 of the housing 500. As mentioned above, the supply path of the connection hose 460 is connected from the tank 420 to the second socket of the grill via the pump 430. The returning path of the connection hose 460 is connected from the first socket 321 to the fluid exhaust hole 422 of the tank 420 via the cooler 440.

FIGS. 12(*a*)-(*d*) illustrate the structure of the installation of the cooling fan 450.

By referring to FIGS. 12(*a*) and (*b*), the cooling fan 450 is installed either at the front or rear side of the cooler 440 so that cool air is forced to be absorbed or exhausted by the cooler 440.

Also, the cooler 440 has two cooling fans 450 as shown in FIG. 12(*c*), or has a duct 452 and a cooling fan 450 as shown in FIG. 12(*d*).

FIG. 13 illustrates a thermoelectric element which is to be applied to the cooler 440. The thermoelectric element is a semiconductor device capable of controlling temperature by freely heating or cooling by use of direct current. An N-type device 446 and a P-type device 448 are connected by a metal 442. If (+) property DC is applied to the N-type device 446, electrons move from the P-type device 448 to the N-type device and heat is absorbed at a side with low temperature and heat is discharged at a side with high temperature.

FIGS. 14 and 15 illustrate the operation of the cooling switch portion 200 according to the installation of the grill 300.

By referring to FIGS. 14 and 15, the cooling switch portion 200 includes a grill sensor portion 210 and an operation switch portion 220.

The operation switch portion 220 sends an operation signal to the cooling device 400 by the handling of the user. The grill sensor portion 210 senses the existence or non-existence of the grill 300 by a sensor (not shown) provided inside of the grill sensor portion 210 and sends the operation signal to the cooling device 400. The cooling device 400 operates only if it receives both signals from the grill sensor portion 210 and from the operation switch portion 220. That is, even if a user handles the operation switch portion 220 and sends the operation signal to the cooling device 400, if the grill sensor portion 210 does not sense the grill and does not send the operation signal to the cooling device 400, the cooling device 400 does not work. Likewise, even if the grill sensor portion 210 sends the operation signal to the cooling device 400, if a user does not operate the operation switch portion 220, the cooling device 400 does not work.

The grill sensor portion 210 includes an operation shaft 211, a spring fitted around the operation shaft 211, and a grill sensor switch (not shown).

The operation shaft 211 is provided to be in contact with the frame 310 of the grill 300 and disposed in parallel with the grill between the first communicating hole 312 and the second communicating hole 313 of the grill 300.

The spring 212 elastically supports the operation shaft 211 in a lateral direction. As the spring 212, a coil spring is generally used, but it is not confined to this. The spring 212 elastically supports the operation shaft 211 so that the operation shaft 211 can protrude outward from the cooling switch portion 200 till bumping with the grill.

If the grill 300 is positioned in place, the grill sensor switch is turned on by the pressure of the operation shaft 211 and sends the operation signal to the cooling device 400.

That is, if the grill 300 is mounted on the body 100, the operation shaft 300 bumps with the grill 300 and moves into the cooling switch portion 200. The operation shaft 211 is pressed by the grill 300 and turns on the grill sensor switch. The grill sensor switch sends the operation signal to the cooling device 400.

Meanwhile, the operation switch portion 220 includes a pair of fluid supply pipes 221, a bracket 222 for supporting the fluid supply pipe 221 in line with the operation shaft 211, a rotator 223 arranged at the lower portion of the bracket 222, an operation knob 224 for rotating the rotator 223, a pin 225 for coupling the bracket 222 with the upper portion of the rotator 223 so that the bracket 222 can move horizontally, and a switch (not shown) for sending an operation signal to the cooling device 400 after having been turned on by the rotation of the rotator 223.

The pair of fluid supply pipes 221 are disposed to be coupled with the first communicating hole 312 and the second communicating hole 313, respectively, and send fluid to the fluid circulation tube 320 of the grill 300. The rotator 223 is a cylinder-like shaped, and has a rotation shaft 223*a* at the center thereof and slant groove 223*b* at a sidewall thereof. The operation knob 224 is provided at one end of the rotation shaft 223*a* of the rotator 223. One end of the pin 225 is taken by the slant groove 223*b*. The switch is disposed inside or outside of the operation switch portion 220 and is turned on if the operation knob 224 is rotated to the working position.

A pair of fluid supply pipes 221 are disposed to be parallel with the operation shaft 211. One end of each fluid supply pipe 221 is connected to the first communicating hole 312 and the second communicating hole 313, and the other end thereof is connected to the connection hose 460.

The bracket 222 is, in a plan view, in the shape of a T which is hollow and has a closed top. A pair of fluid supply pipes 221 and the operation shaft 211 are coupled to go through the upper wall of the bracket 222 and be parallel with the lower portion of the bracket 222.

The rotator 223 is cylinder shaped and rotates by the rotation shaft 223a provided at the center thereof. At a sidewall of the rotator 223, the slanting groove 223b with a certain width is formed. The rotator 223 is disposed at the lower portion of the bracket 222 and coupled with the bracket 222 by means of the pin 225.

The operation knob 224 is attached to one end of the rotation shaft 223a of the rotator 223 and rotates 180 degrees. If the operation knob 224 is rotated to the working position, the switch is turned on by the rotation shaft 223a and sends the operation signal to the cooling device 400.

The pin 225 is screw shaped, and the head of the pin is inserted into the bracket 222 at a right angle to the rotation shaft 223a. One end of the pin 225 is inserted in the slanting groove 223b of the rotator 223, and moves the bracket 222 according to the rotation of the rotator 223 in the direction marked by an arrow as shown.

FIGS. 16(a) and (b) illustrate the structure avoiding the fluid from leaking out of the first socket 321 of the fluid circulation tube 320.

By referring to FIGS. 16(a) and (b), a plunger 232 with a flat head portion is inserted in the first socket 321 of the fluid circulation tube 320. The flat head portion of the plunger 232 is disposed toward the opening of the first socket 321, i.e., the first communicating hole 321a. At the outer side of the body of the plunger 232, a spring 234 is coupled to elastically support the plunger 232. In the opening of the first socket 321, a bushing 236 is inserted. At the rear end of the bushing 236, an O-shaped ring 238 is inserted, the inner diameter of the ring 238 being smaller than the head portion of the plunger 232. At the outer side of the bushing 236 and the O-shaped ring 238, a nut 240 is provided to be coupled with the opening of the first socket 321.

In order to circulate fluid in the fluid circulation tube 320 of the grill 300, as shown in FIG. 16(a), the fluid supply pipe 221 is inserted to the first socket 321 and presses down the protrusion 232a of the head portion of the plunger 232 so that a fluid path is provided. Thereafter, as shown in FIG. 16(b), if the fluid supply pipe 221 is separated from the first socket 321, the position of the plunger 232 is restored by the elasticity of the spring 234 so that the head portion of the plunger is in contact with the O-shaped ring 238, the fluid path thereby being closed.

Meanwhile, although it is not shown in the figure, the second socket 232 of the fluid circulation tube 320 has the same structure as the first socket 231.

FIG. 17 illustrates a water-cooled barbecue system 2 according to another embodiment of the present invention. For the same constitution as the water-cooled barbecue system 1 described above, the same reference numbers are used.

The water-cooled barbecue system 2 has two grills 300. The water-cooled barbecue system 2 can use the grills 300 independently. Also, since the water-cooled barbecue system 2 is large-sized, a cabinet 510 can additionally include a drawer 580.

FIGS. 18 and 19 illustrate the method for cooling the grill 300 of the water-cooled barbecue system 2 as shown in FIG. 17.

By referring to FIG. 18, if the water-cooled barbecue system 2 has one cooling device 400, the one cooling device 400 supplies fluid to the two grills 300. Thus, two connection hoses 460 are connected from the cooling device 400 to the grills 300 respectively. The two connection hoses 460 from the grills 300 are connected to the cooling device 400. At this time, it is preferable that two pumps 430 are provided.

By referring to FIG. 19, if the water-cooled barbecue system 2 has two cooling devices 400, one cooling device 400 supplies fluid to one grill 300.

Also, one or two fuel tanks 110 are provided in the alternative.

Hereinafter, the operation of the water-cooled barbecue system according to the preferred embodiment of the present invention is described.

First, a grill 300 is mounted on the upper portion of the body 100. The grill 300 can be freely mounted on or removed from the upper portion of the body 100. The operation switch portion 220 rotates the operation knob 224 180 degrees.

If the grill 300 is placed on the upper portion of the heating portion 120, the operation shaft 211 of the grill sensor portion 210 is pressed toward the inside of the cooling switch portion 200 by the frame 310 of the grill 300.

If the operation shaft 211 is pressed, the sensor (not shown) installed inside of the cooling switch portion 200 works and turns on the grill sensor switch (not shown).

If the grill sensor switch is connected, an operation signal is transmitted to the cooling device 400. By the above operation signal, the pump 430 pumps fluid from the tank 420. If the cooling device 400 operates, the lamp 130 is turned on.

If the grill sensor switch is not connected, since the cooling device 400 does not operate, fluid cannot be supplied to the grill 300. Thus, if the water-cooled barbecue system 1, 2 is not used, an unnecessary supply of fluid or leakage of fluid, which could damage the water-cooled barbecue system, can be avoided.

After the grill 300 is placed over the upper portion of the heating portion 120, the burner 140 is ignited by means of the control knob 150. If the fuel is charcoal, the charcoal container 170 is provided at the upper portion of the burner 140 to heat the grill 300. As such, the water-cooled barbecue system 1, 2 can be used for the user's convenience without regard to the type of fuel.

If the operation knob 224 rotates, the slanting groove 223b of the rotator 223 rotates together with it. At this time, if the slanting groove 223b is observed from the upper portion of the rotator 223, it appears to move to the right like the right arrow shown in FIG. 15. In the slanting groove 223b, one end of the pin 225 is inserted and the bracket 222 is fixed to the upper portion of the rotator 223 by the pin 225. Thus, if the slanting groove 223b is moved in the direction marked by the right arrow in FIG. 15, the bracket 222 is moved in the same direction.

Accordingly, a pair of fluid supply pipes 221 are moved in the direction marked by the right arrow in FIG. 15 by means of the bracket 222, and one end of both of them is connected to the first communicating hole 312 and the second communicating hole 313. Since the other ends of the fuel supply pipes 221 are connected to the cooling device 400 through the connection hose 460, if the cooling device 400 works, fluid can be supplied to the grill 300.

The fluid is supplied to the fuel circulation tube 320 through the first socket 321 connected to the first communicating hole 312. At this time, since the fuel circulation tube 320 is diverged into at least two, the grill 300 can be cooled down more effectively.

The fuel, which has circulated by divergence from the first socket 321, is exhausted through the second socket 322. The second socket 322 is connected to the connection hose 460 through the second through hole 322*a* and the second communicating hole 313. The fluid is returned to the tank 420 through the cooler 440 in the cooling kit 410. The cooler 440 cools fluid by the operation of the cooling fan 450. The cooling fan 450 introduces cool air to the inside of the cooling kit 410 and discharges the heated air to the outside of the cooling kit 410.

The cooling kit 410 has a transparent window 413 and a buoy 418 to check the water level in the tank 420. The user can control the supply amount of fuel by checking up the water level from the buoy through the transparent window 413.

If the water-cooled barbecue system 1, 2 is not used, the burner 140 or charcoal is extinguished and the grill 300 is removed. If the grill 300 is removed, the pressure of the operation shaft 210 is released and the grill sensor switch is disconnected by the sensor. Accordingly, the cooling device 400 stops working and no more fluid is supplied to the grill 300.

If the grill 300 is to be moved or removed from the water-cooled barbecue system 1, 2, since the structure avoiding the leakage of fuel is provided at the first socket 321 and the second socket 322 of the fuel circulation tube 320 of the grill 300, the user can perform it in a stable manner.

The aforementioned water-cooled barbecue system 1, 2 can be used outdoors by being assembled with the housing 500, and can be used indoors by being separated from the housing 500. Since the shelf 520, the auxiliary shelf 522 and the cooler 530 are provided at both sides of the housing 500, the user can utilize the water-cooled barbecue system 1, 2 for various purposes when preparing and cooking foods thereon.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

The invention claimed is:

1. A water-cooled barbecue system comprising:
    a body, an upper portion thereof being open to provide heat from the supplied fuel, a receiving space being defined by the body;
    a grill with a frame, the frame having a first communicating hole and a second communicating hole to introduce and/or discharge fluid, a fluid circulation tube communicating between the first communicating hole and the second communicating hole being provided inside of the frame;
    a cooling device for cooling fluid which circulates inside of the fluid circulation tube; and
    a cooling switch portion for operating the cooling device to cool the grill, the cooling switch portion including a grill sensor portion for sensing the existence of the grill and determining whether to supply fluid, and an operation switch portion for supplying fluid to the fluid circulation tube by the handling of a user,
    wherein the cooling device is configured to operate only if it receives signals from both the grill sensor and the operation switch.

2. The water-cooled barbecue system according to claim 1, further comprising a housing, which can be moved and assembled, for receiving the body in a detachable manner at an upper portion thereof, wherein at an upper portion of the housing and at one side of the body, a shelf is provided, the shelf having a sliding auxiliary shelf inside thereof.

3. The water-cooled barbecue system according to claim 1, further comprising a housing, which can be moved and assembled, for receiving the body in a detachable manner at an upper portion thereof, wherein inside of the housing, sliding shelves are provided to receive the cooling device and a fuel tank, respectively, and guide rails are provided to withdraw the sliding shelves.

4. The water-cooled barbecue system according to claim 1, wherein the body further comprises: a heating portion for supplying heat to a lower portion of the grill and having a plurality of control knobs at a sidewall thereof; and a lamp for displaying the state of the operation of the cooling device by a signal from the cooling switch portion.

5. The water-cooled barbecue system according to claim 4, wherein the heating portion includes a plurality of pipe-type burners arranged in parallel inside of it.

6. The water-cooled barbecue system according to claim 5, wherein the heating portion further includes a charcoal container disposed at an upper portion of the plurality of pipe-type burners.

7. The water-cooled barbecue system according to claim 1, wherein the grill sensor portion comprises: an operation shaft provided to be in contact with the frame in parallel with the grill between the first communicating hole and the second communicating hole; a spring fitted around the operation shaft and elastically supporting the operation shaft in a horizontal direction; and a grill sensor switch for sending an operation signal to the cooling device if the operation shaft is pressed by the grill.

8. The water-cooled barbecue system according to claim 1, wherein the operation switch portion comprises: a pair of fluid supply pipes disposed to be coupled with the first communicating hole and the second communicating hole and sending fluid to the fluid circulation tube of the grill; a bracket for supporting the fluid supply pipe in line with the operation shaft; a rotator formed in the shape of a certain cylinder, arranged at a lower portion of the bracket, and having a rotation shaft at the center thereof and a slant groove at a sidewall thereof; an operation knob attached to one end of the rotation shaft of the rotator to rotate the rotator; a pin for coupling the bracket with an upper portion of the rotator so that the bracket can move horizontally, one end of the pin being taken by the slant groove; wherein the operation switch sends an operation signal to the cooling device if a user rotates the operation knob to a working position.

9. The water-cooled barbecue system according to claim 1, wherein the fuel is gas or charcoal.

10. The water-cooled barbecue system according to claim 1, wherein the fluid circulation tube includes a first socket and a second socket which communicate with the first communicating hole and the second communicating hole, respectively, one or more tubes being branched from the first socket to form a wave path and return to the second socket.

11. The water-cooled barbecue system according to claim 10, wherein a plunger with a flat head portion is inserted in the first and the second sockets, the flat head portion of the plunger is disposed toward an opening of the first and the second sockets, a spring is coupled to elastically support the plunger at an outer side of the body of the plunger, a bushing is inserted in the opening of the first and the second sockets, an O-shaped ring is inserted in the rear end of the bushing, and a nut is provided to be coupled with the opening of the first and the second sockets at the outer side of the bushing and the O-shaped ring.

12. The water-cooled barbecue system according to claim 1, wherein the cooling device is provided in a separate cooling kit.

13. The water-cooled barbecue system according to claim 12, further comprising a housing, which can be moved and assembled, for receiving the body in a detachable manner at an upper portion thereof, wherein the cooling kit is placed on a sliding shelf disposed in the housing and, between the sliding shelf and a door of the housing, a crank bar for withdrawing the sliding shelf is provided.

14. The water-cooled barbecue system according to claim 1, wherein the cooling device comprises: a tank for containing fluid inside of it; a pump for pumping the fluid inside of the tank toward the fluid circulation tube; a cooler for cooling the fluid which has been discharged after the circulation in the fluid circulation tube; a cooling fan for circulating cool air to cool down the heated cooler; and a connection hose connected with the tank to supply the fluid to the fluid circulation tube and return the fluid which has circulated the fluid circulation tube to the tank.

15. The water-cooled barbecue system according to claim 12, wherein the cooling kit comprises: a transparent window and a buoy for marking the water level in the tank; a drain for discharging water being disposed at a bottom surface thereof; and an inflow hole for introducing fluid being disposed at an upper portion thereof, the inflow hole having a filter for filtering impurities.

16. The water-cooled barbecue system according to claim 14, wherein the fluid is water or coolant.

17. The water-cooled barbecue system according to claim 14, wherein the tank is made of a transparent material and has a fluid supply opening at an upper portion thereof and a fluid discharge opening at a lower portion thereof.

18. The water-cooled barbecue system according to claim 14, wherein between the cooler and the cooling fan, a duct is provided.

19. The water-cooled barbecue system according to claim 14, wherein the cooler includes a cooling portion with a thermoelectric element that is capable of heating or cooling fluid by use of direct current, and a power supply portion.

* * * * *